US012739085B2

(12) United States Patent
Lin et al.

(10) Patent No.: US 12,739,085 B2
(45) Date of Patent: Sep. 15, 2026

(54) ENHANCED CHANNEL SOUNDING REPORTS FOR WLAN SYSTEMS

(71) Applicant: INTERDIGITAL PATENT HOLDINGS, INC., Wilmington, DE (US)

(72) Inventors: Zinan Lin, Basking Ridge, NJ (US); Hanqing Lou, Syosset, NY (US); Mahmoud Saad, Montreal (CA); Xiaofei Wang, North Caldwell, NJ (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 264 days.

(21) Appl. No.: 18/567,922

(22) PCT Filed: Jun. 7, 2022

(86) PCT No.: PCT/US2022/032513

§ 371 (c)(1),
(2) Date: Dec. 7, 2023

(87) PCT Pub. No.: WO2022/261104

PCT Pub. Date: Dec. 15, 2022

(65) Prior Publication Data

US 2024/0275566 A1 Aug. 15, 2024

Related U.S. Application Data

(60) Provisional application No. 63/279,487, filed on Nov. 15, 2021, provisional application No. 63/223,724,
(Continued)

(51) Int. Cl.
*H04L 5/00* (2006.01)
*H04B 7/06* (2006.01)

(52) U.S. Cl.
CPC ......... *H04L 5/0094* (2013.01); *H04B 7/0626* (2013.01); *H04B 7/0632* (2013.01)

(58) Field of Classification Search
None
See application file for complete search history.

(56) References Cited

U.S. PATENT DOCUMENTS 10,383,092 B2 8/2019 Vermani et al.
2017/0054542 A1* 2/2017 Vermani ............. H04B 7/0626
(Continued)

FOREIGN PATENT DOCUMENTS

EP 3 731 428 10/2020
WO 2019/213565 11/2019
WO 2019217154 A1 11/2019

OTHER PUBLICATIONS

Au, "Compendium of straw polls and potential changes to the Specification Framework Document," IEEE 802.11-20/0566r59 (Aug. 2020).

(Continued)

*Primary Examiner* — Lonnie V Sweet
(74) *Attorney, Agent, or Firm* — VOLPE KOENIG

(57) ABSTRACT

Methods and apparatuses for channel sounding reports may be used in wireless local area network (WLAN) systems. A station (STA) may receive, from an access point (AP), a beacon frame. The STA may receive, from the AP, a null data packet (NDP) announcement (NDPA) frame including an indication of subchannels for measuring channel characteristics. The STA may receive, from the AP, an NDP frame. The STA may transmit, to the AP, a feedback report frame including channel state information (CSI) feedback, wherein the CSI feedback is based on measurements that the STA performed on the received NDP frame using the indicated subchannels for measuring channel characteristics. The bea-
(Continued)

con frame may include indications of punctured subchannel(s) and subchannel(s) that is not punctured, which may be indicated as a disabled subchannel bitmap. The subchannels for measuring channel characteristics may be equal to or a subset of the subchannel(s) that is not punctured.

20 Claims, 35 Drawing Sheets

Related U.S. Application Data filed on Jul. 20, 2021, provisional application No. 63/218,764, filed on Jul. 6, 2021, provisional application No. 63/197,796, filed on Jun. 7, 2021.

(56) References Cited

U.S. PATENT DOCUMENTS

| | | | | |
|---|---|---|---|---|
| 2017/0111148 | A1 | 4/2017 | Park et al. | |
| 2019/0215037 | A1 | 7/2019 | Seok et al. | |
| 2019/0261369 | A1* | 8/2019 | Verma | H04L 5/0048 |
| 2019/0373569 | A1 | 12/2019 | Ram et al. | |
| 2020/0358486 | A1 | 11/2020 | Suh et al. | |
| 2022/0140987 | A1 | 5/2022 | Park et al. | |
| 2023/0086669 | A1 | 3/2023 | Yu et al. | |
| 2024/0195589 | A1 | 6/2024 | Lim et al. | |
| 2024/0381110 | A1 | 11/2024 | Noh et al. | |

OTHER PUBLICATIONS

Au, “Specification Framework for TGbe,” 802.11-19/1262r8 (Feb. 2020).
Cariou, “802.11 EHT Proposed PAR,” IEEE 802.11-18/1231r4 (Jan. 2019).
Cariou, “IEEE 802.11 EHT draft Proposed CSD,” IEEE 802.11-18/1233r4 (Jan. 2019).
Chen et al., “Discussions on sensing measurement flows,” IEEE 802.11-21/0990r2 (Jun. 2021).
Deshmukh et al, “Intelligent Feedback Overhead Reduction (iFOR) in Wi-Fi 7 and Beyond,” 2022 IEEE 95th Vehicular Technology Conference (Jun. 19-22, 2022).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D1.0 (May 2021).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D6.0 (Nov. 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE 802.11ax-2021 (Feb. 2021).
Jia et al., “Multi-AP Sounding Discussion,” IEEE 802.11-20/0052 (Jan. 2020).
Jiang et al., “Channel Sounding for Multi-AP CBF,” IEEE 802.11-20-0123-02-00be (Jan. 2020).
Lim et al., “Non-TB and TB measurement procedure for WLAN sensing,” IEEE 802.11-21/1015r2 (Jun. 2021).
Lin et al., “CC36 CR for CID 5675 7793,” IEEE 802.11-21/2019r5 (Nov. 2021).
Lin et al., “CC36 CR for CID 6841 6842 6843,” IEEE 802.11-21/1243r0 (Jul. 2021).
Liu et al., “Joint Sounding for Multi-AP Systems,” IEEE 802.11-19/1593r3 (Sep. 2019).
Yu et al., “Sounding procedure in AP collaboration,” IEEE 802.11-19/1097r0 (Jul. 2019).
Chen et al., “Proposed changes for MU type sounding feedback,” IEEE 802.11-21/0886r3 (May 13, 2021).
Lee, “D0.3 CR for Spatial Stream And MIMO Enhancement,” IEEE 802.11-21/0272r4 (Feb. 18, 2021).
Chen et al., “EHT Punctured NDP and Partial BW Feedback Tones,” IEEE 802.11-20/1161r1 (Aug. 25, 2020).

* cited by examiner

FIG. 18
1800
1802
EHT Beamformer
$1804_1$
EHT Beamformee 1
$1804_2$
EHT Beamformee 2
$1804_n$
EHT Beamformee n
1806
EHT NDP Announcement
1808
EHT NDP
1810
BFRP Trigger
t
$1812_1$
Beamforming Matrix Index 1
$1812_2$
Beamforming Matrix Index 2
$1812_n$
Beamforming Matrix Index n

ENHANCED CHANNEL SOUNDING REPORTS FOR WLAN SYSTEMS

CROSS-REFERENCE TO RELATED APPLICATIONS

This application is the U.S. National Stage, under 35 U.S.C. § 371, of International Application No. PCT/US2022/032513 filed Jun. 7, 2022, which claims the benefit of U.S. Provisional Application No. 63/197,796, filed Jun. 7, 2021, U.S. Provisional Application No. 63/218,764, filed Jul. 6, 2021, U.S. Provisional Application No. 63/223,724, filed Jul. 20, 2021, and U.S. Provisional Application No. 63/279,487, filed Nov. 15, 2021 the contents of which are incorporated herein by reference.

SUMMARY

Methods and apparatuses are described herein for channel sounding reports, which may be used in wireless local area network (WLAN) systems. A station (STA) may receive, from an access point (AP), a beacon frame. The STA may receive, from the AP, a null data packet (NDP) announcement (NDPA) frame including an indication of subchannels for measuring channel characteristics. The STA may receive, from the AP, an NDP frame. The STA may transmit, to the AP, a feedback report frame including channel state information (CSI) feedback, wherein the CSI feedback is based on measurements that the STA performed on the received NDP frame using the indicated subchannels for measuring channel characteristics. The beacon frame may include an indication of at least one punctured subchannel and an indication of at least one subchannel that is not punctured. The indication of the at least one punctured subchannel and the indication of the at least one punctured subchannel may be indicated as a disabled subchannel bitmap. The subchannels for measuring channel characteristics may be equal to or a subset of the at least one subchannel that is not punctured.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
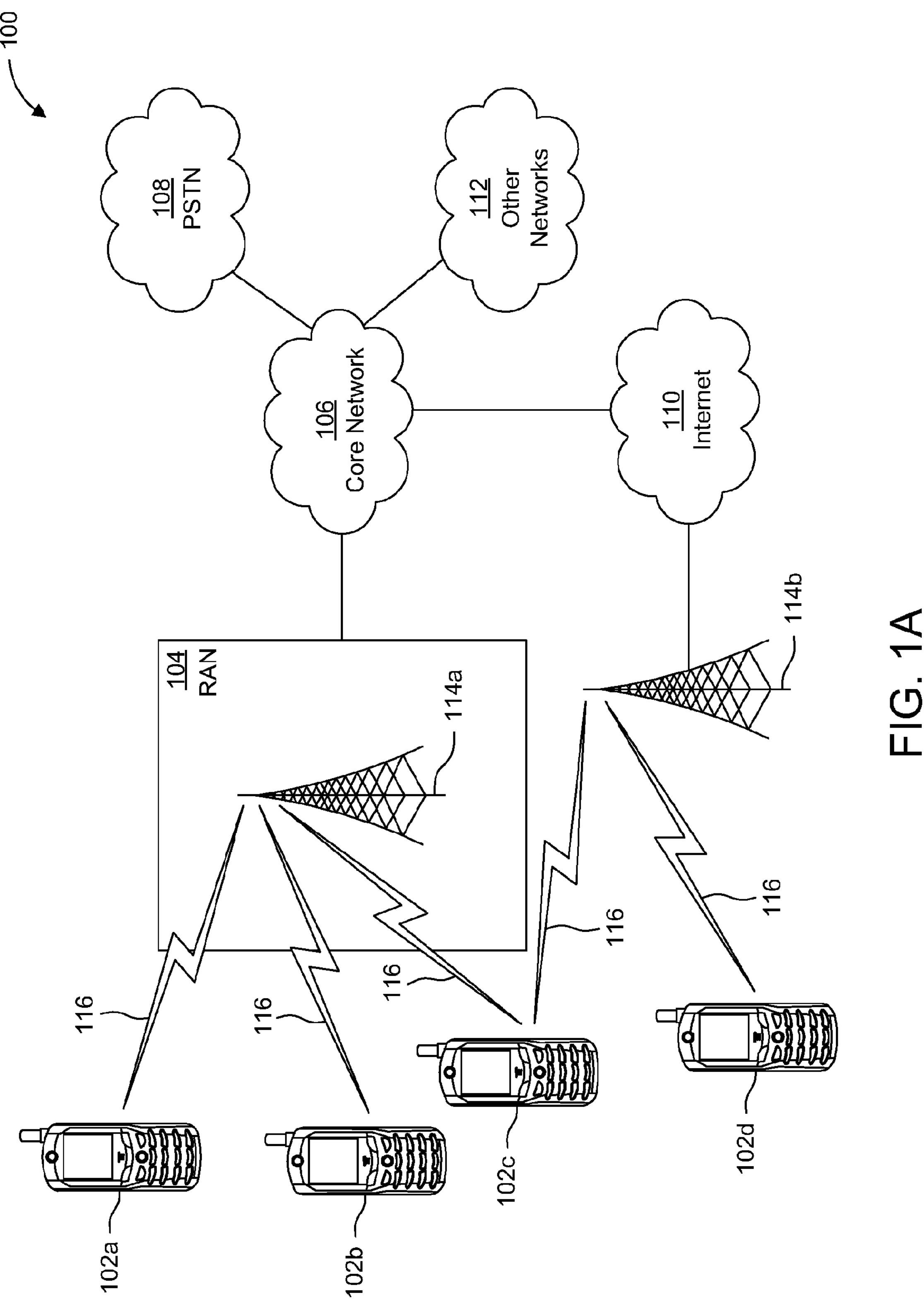
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
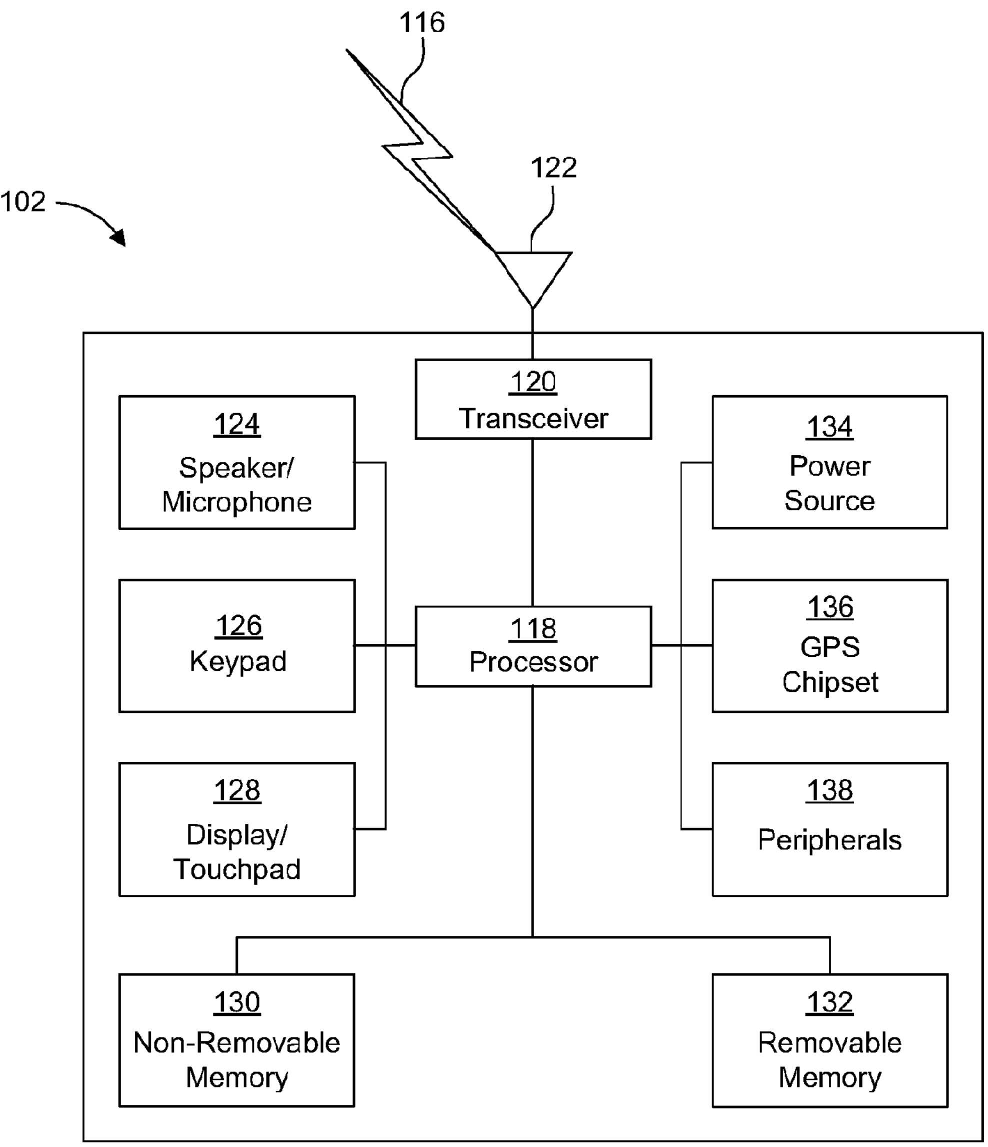
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
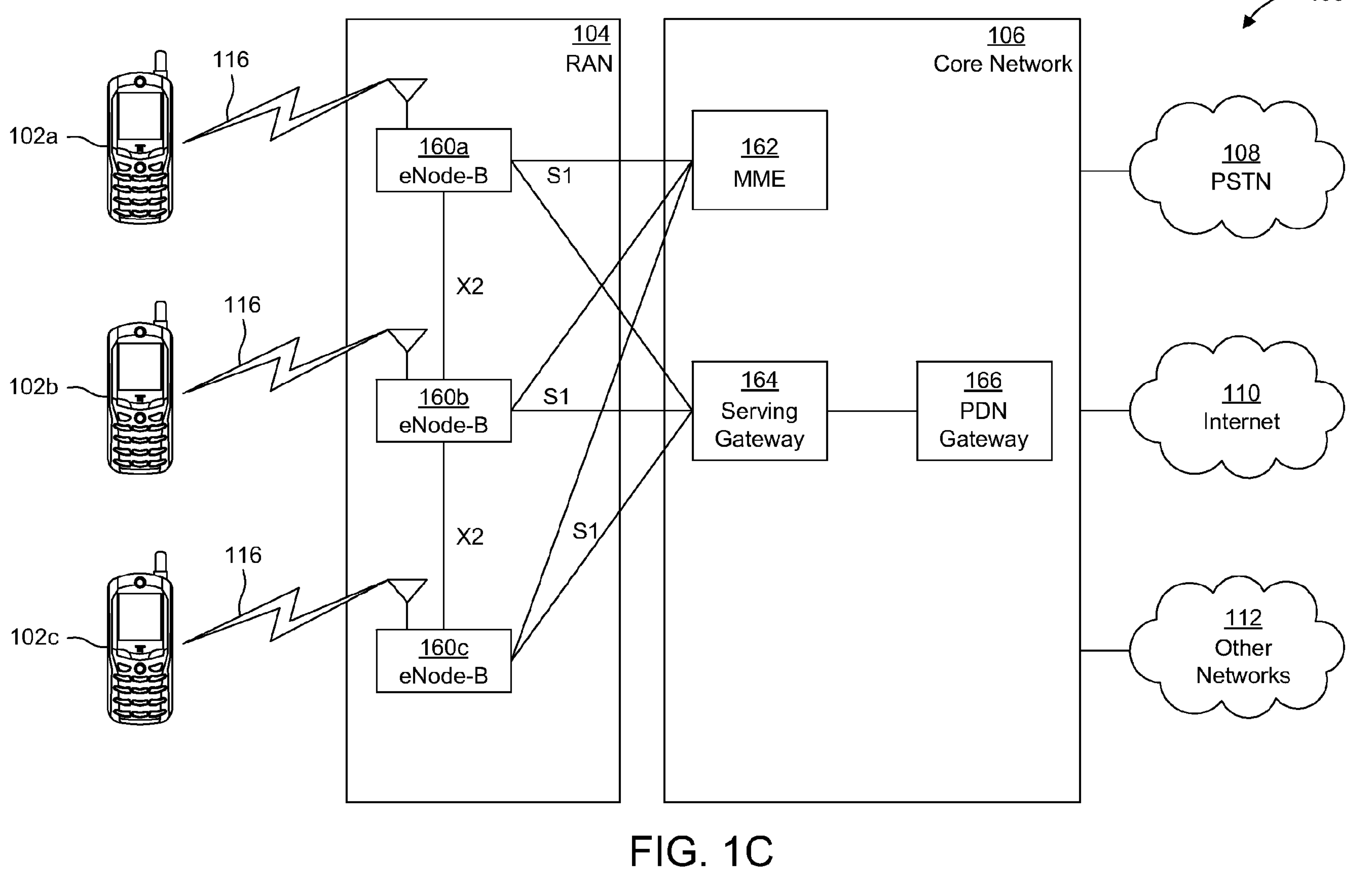
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs (e.g., according to 802.11n) may use a 40 MHz wide channel for communication, for example, via a combination of the primary 20 MHz channel with an adjacent or nonadjacent 20 MHz channel to form a 40 MHz wide channel.

Very High Throughput (VHT) STAs (e.g., according to 802.11ac) may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
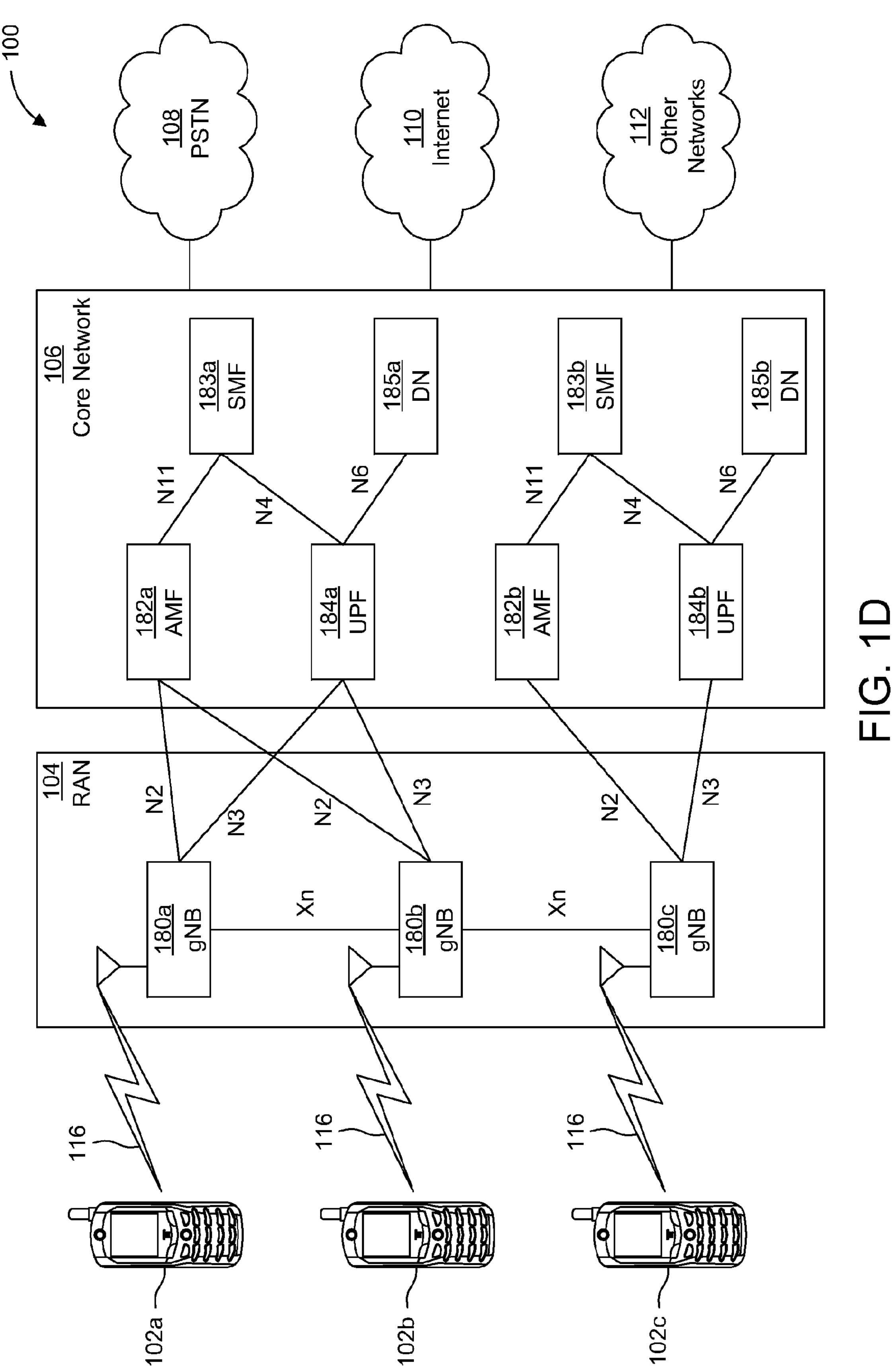
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

To improve spectral efficiency 802.11 ac has introduced the concept for downlink Multi-User MIMO (MU-MIMO) transmission to multiple STA's in the same symbol's time frame, for example, during a downlink OFDM symbol. The potential for the use of downlink MU-MIMO is also currently considered for 802.11ah. It is important to note that since downlink MU-MIMO, as it is used in 802.11ac, uses the same symbol timing to multiple STA's interference of the waveform transmissions to multiple STA's is not an issue. However, all STA's involved in MU-MIMO transmission with the AP may need to use the same channel or band, this limits the operating bandwidth to the smallest channel bandwidth that is supported by the STA's which are included in the MU-MIMO transmission with the AP.

The Institute of Electrical and Electronics Engineers (IEEE) 802.11 Extremely High Throughput (EHT) amendment, referred to as IEEE 802.11be, explores the possibility to further increase peak throughput and improve efficiency of IEEE 802.11 networks. Example use cases and applications targeted by 802.11 be may include high throughput and low latency applications such as Video-over-WLAN, Augmented Reality (AR), Virtual Reality (VR). A list of features to achieve the target increased peak throughput and improved efficiency may include, but are not limited to, multi-access point (multi-AP), multi-Band/multi-link, 320 MHz bandwidth, 16 spatial streams, hybrid automatic repeat request (HARQ), AP coordination, and/or new designs for 6 GHz channel access.

(EHT) stations (STAs) may use (EHT) sounding protocols, adapted to the features of IEEE 802.11 be, to determine the channel state information (CSI) and provide the feedback for the channel state information. For example, EHT sounding protocol may provide explicit feedback mechanisms, such as EHT non-trigger-based (non-TB) sounding procedure and/or EHT trigger-based (TB) sounding procedure, where the EHT beamformee (AP or STA) may measure the channel using a training signal (e.g., an (EHT) sounding null data packet (NDP) frame) transmitted by the EHT beamformer (AP or STA), and may send back to the beamformer a transformed estimate of the channel state. The EHT beamformer may use this estimate to derive the steering matrix.

The EHT beamformee may return an estimate of the channel state in an EHT compressed beamforming/Channel Quality Indicator (CQI) report carried in one or more EHT Compressed Beamforming/CQI frames. Example types of EHT compressed beamforming/CQI reports include: Single-User (SU) feedback, Multi-User (MU) feedback, and CQI feedback. In the SU feedback, the EHT compressed beamforming/CQI report may comprise an EHT Compressed Beamforming Report field. In the MU feedback, the EHT compressed beamforming/CQI report may comprise an EHT Compressed Beamforming Report field and EHT MU Exclusive Beamforming Report field. In the CQI feedback, the EHT compressed beamforming/CQI report may comprise an EHT CQI Report field.

Coordinated multi-AP (C-MAP) transmissions may be supported in 802.11be. The 802.11be Multi-AP transmission schemes may include, but are not limited to: Coordinated Multi-AP OFDMA, Coordinated Multi-AP TDMA, Coordinated Multi-AP Spatial Reuse, Coordinated beamforming/nulling and Joint Transmission. In the context of coordinated Multi-AP, a sharing AP may be an EHT AP that obtains a transmission opportunity (TXOP) and initiates the multi-AP coordination. In the context of coordinated Multi-AP, a shared AP may be an EHT AP that is coordinated for the multi-AP transmission by the sharing AP. In the context of coordinated Multi-AP, an AP candidate set may be a set of APs that may initiate and/or participate in multi-AP coordination.

For use with 802.11 be or other coordinated multi-AP protocols, mechanisms may be used to determine whether an AP is part of an AP candidate set and can participate as a shared AP in coordinated AP transmission initiated by a sharing AP. A procedure may be used for an AP to share its frequency/time resources of an obtained TXOP with a set of APs. An AP that intends to use the resource (i.e. frequency and/or time) shared by another AP may indicate its resource needs to the AP that shared the resource. Coordinated OFDMA may be supported in 802.11be. DL OFDMA and/or its corresponding UL OFDMA acknowledgement may be used in coordinated OFDMA.

In an example, channel sounding in 802.11n and 802.11ac may be performed using two different schemes, explicit channel sounding or implicit channel sounding. According to explicit channel sounding, the AP may transmit an NDP frame to the STA such that the NDP frame includes a preamble that allows the receiving STA to measure its own channel and send CSI feedback to the AP. According to implicit channel sounding, the STA may send an NDP frame to the AP, and the AP may measure the channel of the STA based on the received NDP frame, under the assumption that the channel is (approximately) reciprocal.

802.11be may support a maximum of 16 spatial streams for SU-MIMO and for MU-MIMO, where the maximum number of spatial streams allocated to each MU-MIMO scheduled non-AP STA may be limited to four spatial streams. The maximum number of users spatially multiplexed for DL transmissions may be eight users per RU. 802.11be may support modes of channel sounding in Multiple-AP, including sequential sounding and/or joint sounding. According to sequential sounding, each AP may transmit an NDP frame independently such that the sounding periods of the APs don't overlap. Joint sounding mode may be provided for Multiple-AP, where an AP with 8 or less total antennas may have all antennas active on all long training field (LTF) tones and may use P-matrix (e.g., 802.11 ax P-matrix) across OFDM symbols. The CSI feedback collection may be performed using a multi-step sounding sequence, such as a four-step sounding sequence (e.g., NDP Announcement (NDPA) frame, NDP frame, Beamforming Report Poll (BFRP) Trigger Frame (TF), and/or CSI report) in Multiple-AP to collect the feedback from both in-BSS and overlapping BSS (OBSS) STAs. For sequential sounding for Multiple-AP, a STA may process an NDPA frame and the BFRP Trigger frame received from the OBSS AP and the STA may respond with the corresponding CSI to the OBSS AP, if polled by the BFRP TF from the OBSS AP. In the following frame, packet, message, transmission, and physical layer protocol data unit (PPDU) may be used interchangeably. A beamformer may be an AP or a non-AP STA, and similarly a beamformee beamformer may be an AP or a non-AP STA. STA or user may be used when discussing a beamformer or beamformee, and vice-versa. In any of the example frame or field formats disclosed herein, the order of fields, and number of bits allocated to a field are given as an example, and any order of fields or number of bits is likewise supported. In any of the example frame or field formats disclosed herein, any subset of fields may be included and other fields not shown may also be included in the frames. An EHT descriptor for a frame or device is used as an example, and may be included or omitted in any of the examples given herein.

Figure 2:
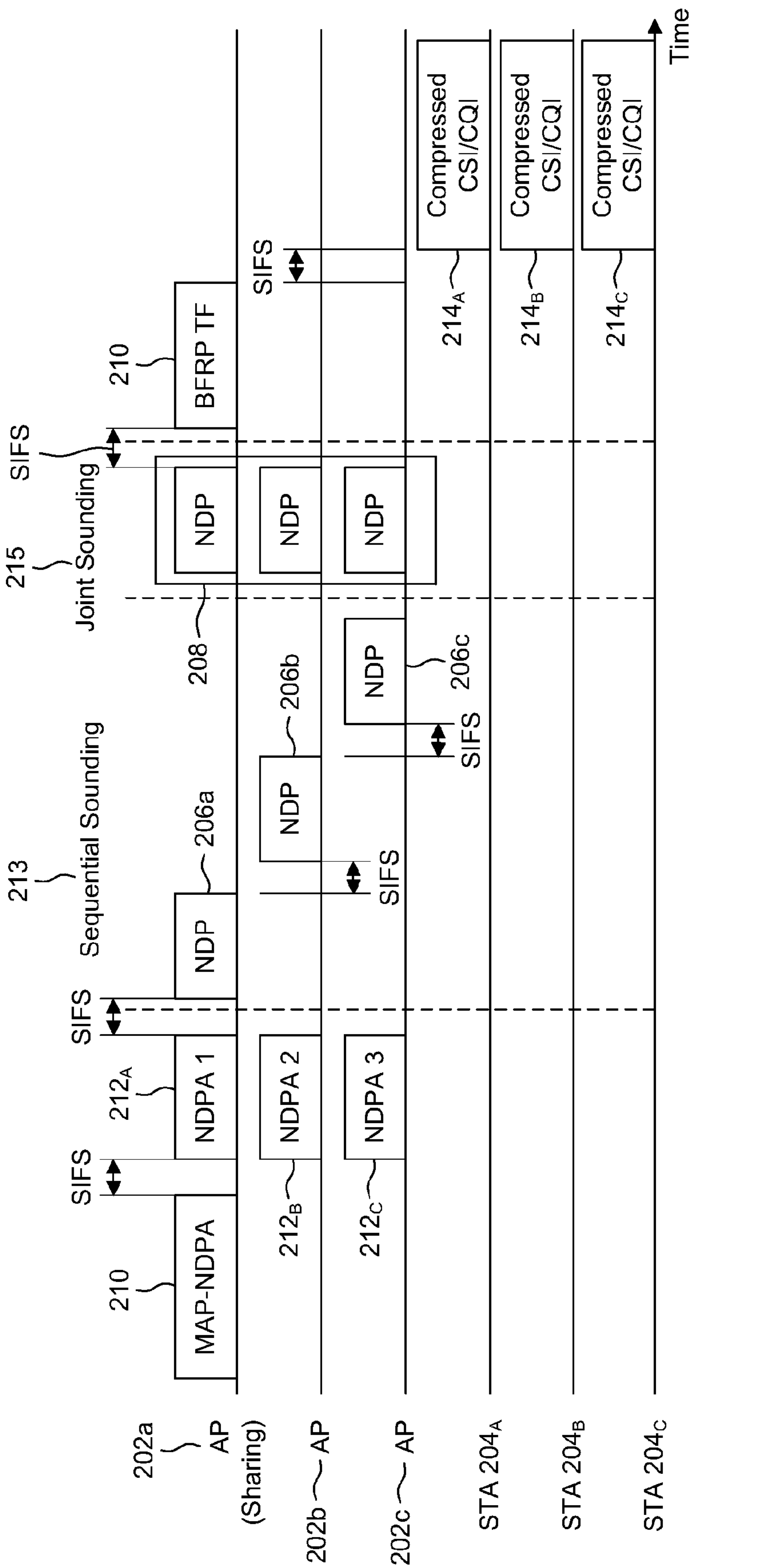
FIG. 2 is a system diagram illustrating examples of sounding procedures, such as sequential channel sounding and joint channel sounding, in a multiple access point (Multi-AP) environment.

FIG. 2 is a system diagram illustrating examples of sounding procedures 200, such as sequential channel sounding 213 and joint channel sounding 215, in a multiple access point (Multi-AP) environment. Although shown in the same illustration, the same sequential channel sounding 213 and joint channel sounding 215 may be used separately. A sequential sounding procedure 213 and/or a joint sounding procedure 215 may follow the transmission by the AP 202*a* of the MAP-NDPA frame 201, and the transmission by each AP (i.e., AP 202*a*, AP 202*b*, and AP 202*c*) of respective NDPA frames 212*a*, 212*b*, and 212*c*. In sequential sounding 213, each AP (i.e., AP 202*a*, AP, 202*b*, and AP 202*c*) in the coordinating group transmits a respective NDP frame 206*a*, 206*b*, and 206*c* in a different non-overlapped time to all the STAs 204*a*, 204*b*, 204*c* in the coordinating group (i.e., time-multiplexed). In joint sounding 215, the coordinated APs (i.e., AP1 202*a*, AP2, 202*b*, and AP3 202*c*) may transmit NDP frames 208 simultaneously; in this case different LTF tones may span the entire bandwidth and be multiplexed spatially or orthogonal codes may be used such that LTF tones are only sent on selected tones for each AP. Following sounding 213/215, the sharing AP 202*a* may send a BFRP TF 210 to trigger the sending of channel state feedback based on the sequential/joint sounding 213/215 from the STAs 204*a*, 204*b*, 204*c* (i.e., compressed CSI/CQI frames 214*a*, 214*b*, 214*c*). Interframe spacing (e.g., short interframe space (SIFS)) may be used between frames.

A STA that receives an NDP frame may measure the channel based on the received NDP frame and prepare the CSI feedback report. Approaches for collecting the CSI at the APs from the STAs may include, but are not limited to: each AP collecting all CSI, which may include the feedback of the in-BSS and OBSS stations; each AP collecting CSI from its associated STAs only; and/or the sharing AP (e.g., AP 202*a* in FIG. 2) collects the CSI for all the shared APs (e.g., AP 202*b* and AP 202 in FIG. 2) in the coordination group.

For channel sounding in multi-AP system, STAs involved in the sounding may not be able to receive signals transmitted by the coordinating (sharing or master) AP. Synchronization of APs in the Multi-AP coordinating set may be needed. Overhead, complexity and performance of different sounding schemes may need to be considered. Variants of NDP frame transmission in explicit and implicit sounding, feedback collection and reduction are approaches that may be used in for sounding in Multi-AP systems, as disclosed herein. As described herein, field, subfield, information element (IE), and element may be used interchangeably when describing frame formats.

Figure 3:
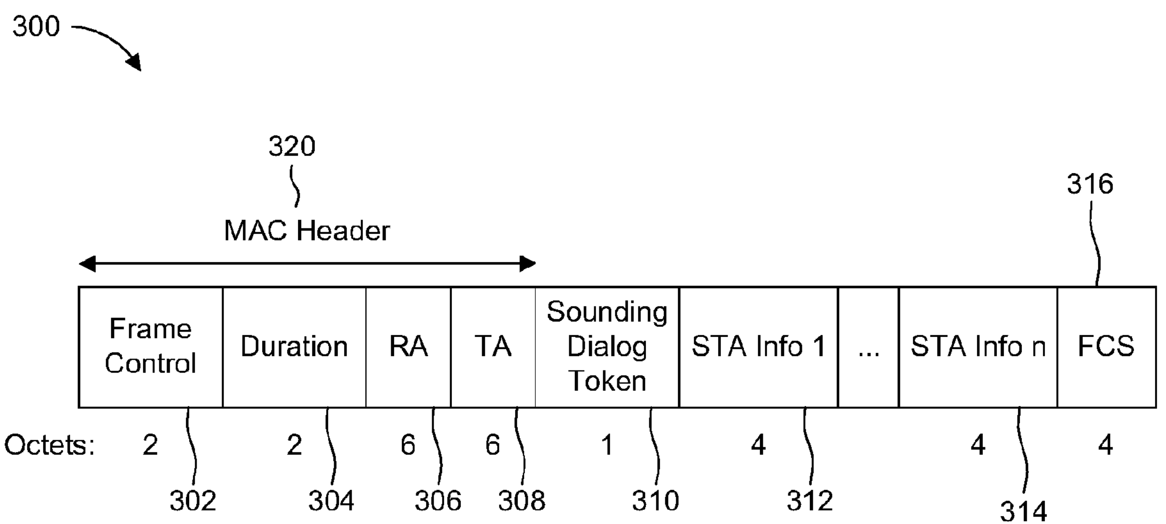
FIG. 3 is a diagram illustrating an example high efficiency null data packet (HE NDP) Announcement frame format.

FIG. 3 is a diagram illustrating an example high efficiency null data packet (HE NDP) Announcement (NDPA) frame 300 format, which may be compatible with 802.11be and/or 802.11ax. The HE NDP Announcement frame 300 may include Frame Control field 302, Duration field 304, RA field 306, TA field 308, Sounding Dialog Token field 310, STA Info field 312, STA Info n field 314, and FCS field 316. The Frame Control field 302 may be 2 octets. The Duration field 304 may be 2 octets. The RA field 306 may be 6 octets. The TA field 308 may be 6 octets. The Sounding Dialog Token field 310 field may be 1 octet. The STA Info 1 field 312 and STA Info n field 314 may be 4 octets. The FCS field 316 may be 4 octets. The Frame Control field 302, Duration field 304, RA field 306, and TA field 308 may be part of a MAC header 320.

Figure 4:
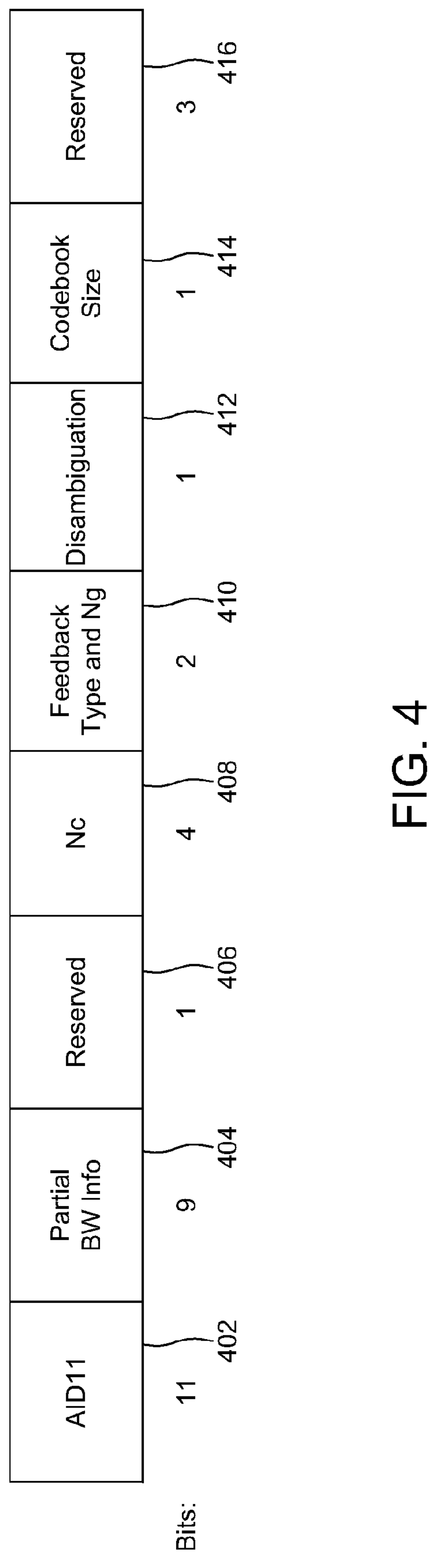
FIG. 4 is a diagram illustrating an example station (STA) Information (Info) field format in an EHT NDP Announcement frame.

FIG. 4 is a diagram illustrating a STA Info field 400 format in an EHT NDP Announcement frame (such as the HE NDPA frame 300 in FIG. 3), which may be compatible with 802.11be and/or 802.11 ax. The STA Info field 400 may accommodate features of EHT. As shown in FIG. 4, the STA Info field 400 format in an EHT NDP Announcement frame may include Association identity (AID) 11 subfield 402, Partial Bandwidth (BW) Information (Info) subfield 404, Reserved subfield 406, Nc subfield 408, Feedback Type and Ng subfield 410, Disambiguation subfield 412, Codebook Size subfield 414, and Reserved subfield 416. The AID11 subfield 402 may be 11 bits. The Partial BW Info subfield 404 may be 9 bits. The Reserved subfield 406 may be 1 bit. The Nc subfield 408 may be 4 bits. The Feedback Type and Ng subfield 410 may be 2 bits. The Disambiguation subfield 412 may be 1 bit. The Codebook Size subfield 414 may be 1 bit. The Reserved subfield 416 may be 3 bits.

Figure 5:
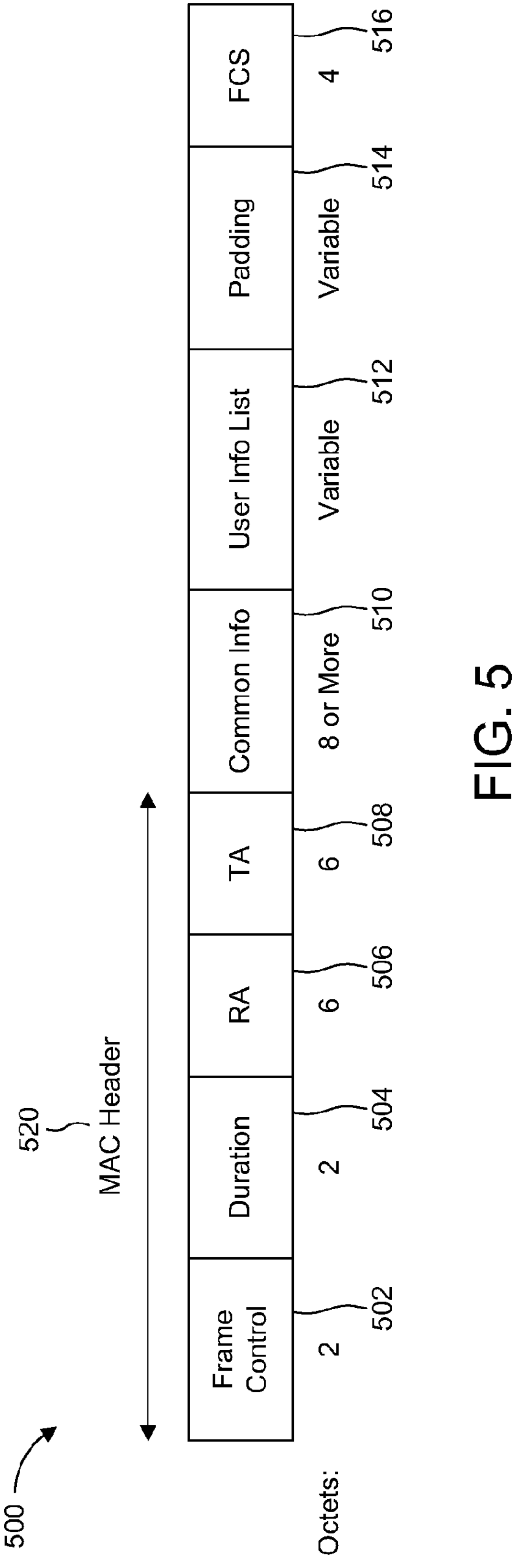
FIG. 5 is a diagram illustrating a Trigger Frame (TF) format.

FIG. 5 is a diagram illustrating an example Trigger Frame format 500. A trigger frame 500 was introduced in 802.11ax to allocate resources and trigger single or multi-user (MU) access in the uplink (UL). As shown in FIG. 5, the Trigger Frame format 500 may include Frame Control field 502, Duration field 504, receiver address (RA) field 506, transmitter address (TA) field 508, Common Info field 510, User Info List field 512, Padding field 514, and frame check sequence (FCS) field 516. The Frame Control field 502, Duration field 504, RA field 506, and TA field 508 may part of the MAC header 520. The Frame Control field 502 may be 2 octets. The Duration field 504 may be 2 octets. The RA field 506 may be 6 octets. The TA field 508 may be 6 octets. The Common Info field 510 may be 8 or more octets. The User Info List field 512 and Padding field 514 may be variable octets. The FCF field 516 may be 4 octets.

Figure 6:
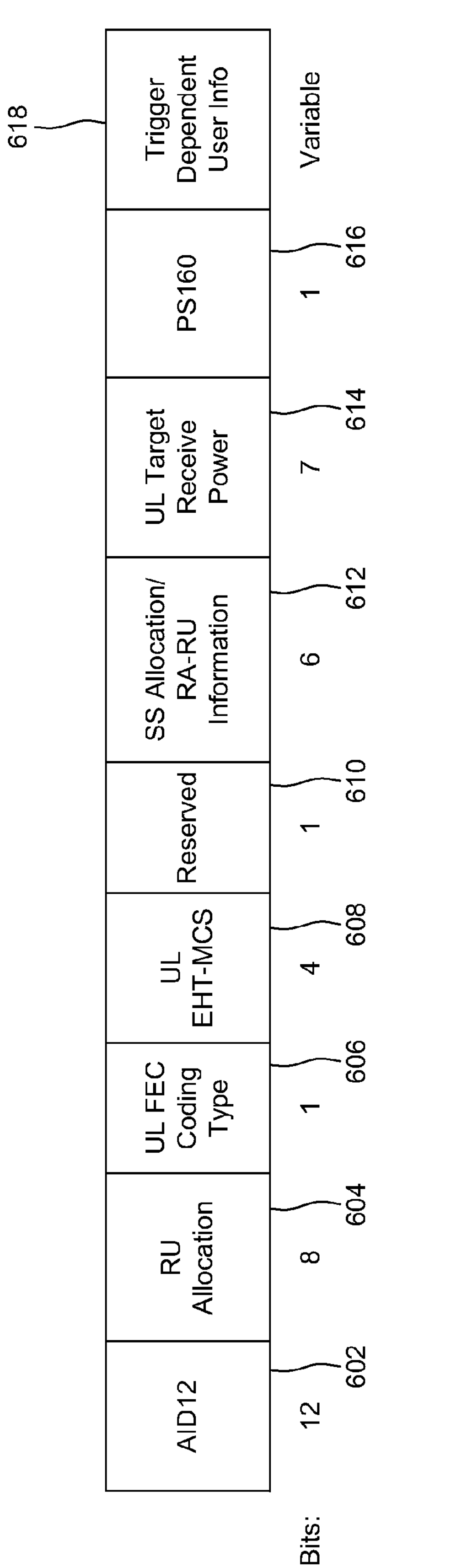
FIG. 6 is a diagram illustrating an example EHT Variant User Info field format.
Figure 7:
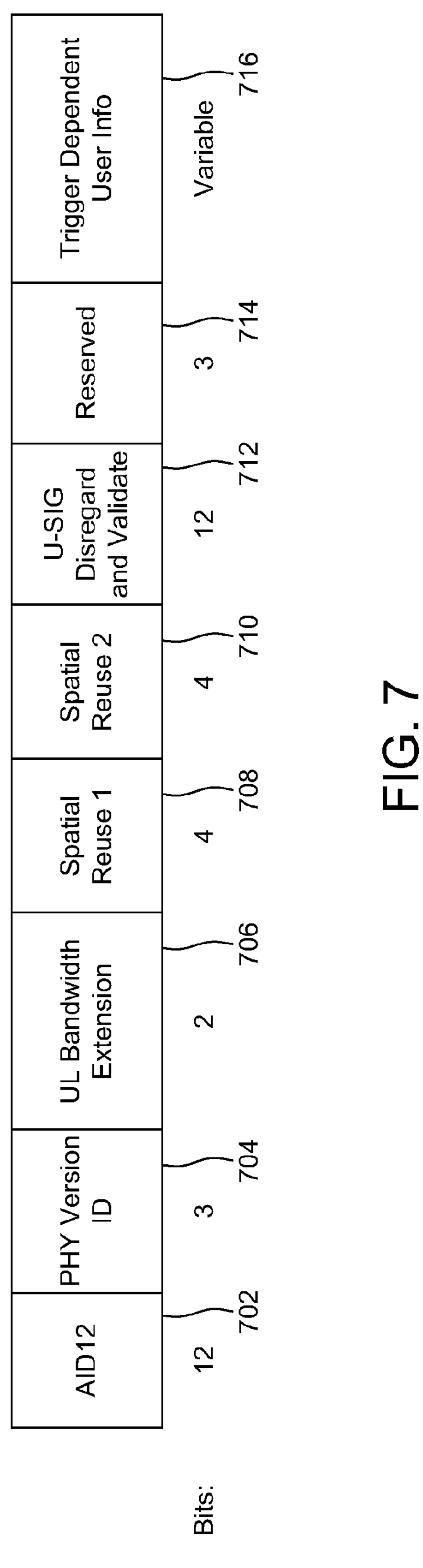
FIG. 7 is a diagram illustrating an example EHT Special User Info field format.

FIG. 6 is a diagram illustrating an example EHT Variant User Info field format 600 and FIG. 7 is a diagram illustrating an example of a EHT Special User Info field 700 format. The frame formats illustrated in FIG. 6 and FIG. 7 provide a unified triggering scheme for both HE and EHT devices. As illustrated in FIGS. 5, 6, and 7, a variant of the User Info field may be used (for example in 802.11be), and a Special User Info field may be added just after the Common Info field.

With reference to FIG. 6, the EHT Variant User Info field format 600 may include an AID12 field 602, Resource Unit (RU) Allocation subfield 604, UL forward error correction (FEC) Coding Type subfield 606, UL EHT-modulation and coding (MCS) subfield 608, Reserved subfield 610, spatial stream (SS) Allocation/random access (RA(-RU Information subfield 612, UL Target Receive Power subfield 614, Primary/Secondary 160 (PS160) subfield 616, and Trigger Dependent User Info subfield 618. The AID12 subfield 602 may be 12 bits. The RU Allocation subfield 604 may be 8 bits. The UL FES Coding Type subfield 606 may be 1 bit. The UL EHT-MCS subfield 608 may be 4 bits. The Reserved subfield 610 may be 1 bit. The SS Allocation/RA-RU Information subfield 612 may be 6 bits. The UL Target Receive Power subfield 614 may be 7 bits. The PS160 subfield 616 may be 1 bit. The Trigger Dependent User Info subfield 618 may be variable bits.

With reference to FIG. 7, the EHT Special User Info field 700 may include an AID12 subfield 702, PHY Version ID subfield 704, UL Bandwidth Extension subfield 706, Spatial Reuse 1 subfield 708, Spatial Reuse 1 subfield 710, U-SIG Disregard and Validate subfield 712, Reserved subfield 714, and Trigger Dependent User Info subfield 716. The AID12 subfield 702 may be 12 bits. The PHY Version ID subfield 704 may be 3 bits. The UL Bandwidth Extension subfield 706 may be 2 bits. The Spatial Reuse 1 subfield 708 may be 4 bits. The Spatial Reuse 2 subfield 710 may be 4 bits. The U-SIG Disregard and Validate subfield 712 may be 12 bits. The Reserved subfield 714 subfield may be 3 bits. The Trigger Dependent User Info subfield 716 may be variable bits.

According to example sounding protocols, a beamformer (AP or STA) may request information on the channel state, for example by sending an (EHT) sounding NDP frame. Upon receipt of the sounding NDP frame, the beamformee (AP or STA) may compute a set of matrices for feedback to the beamformer. The beamformee may generate the beamforming matrices with a number of rows $N_r$, equal to the number of spatial streams, $N_{SS}$, of the EHT sounding NDP frame received by the beamformee. $N_{SS}$ may be a function of the number of transmit antennas at the beamformer. As such, the number of transmit antennas at the beamformer increases, the number of bits required by the beamforming matrices increases and can result in large overhead for the feedback information. Thus, a feedback mechanism to significantly reduce the size of reporting feedback with minimum performance loss may be used, as disclosed herein.

With beamforming Multiple Matrix (V) Index (VI) feedback, a beamformee STA may to estimate the channel, correlate/compare with predefined VI matrix set(s) and select one or more matrix indices to feedback to a beamformer STA. STAs may have different capabilities to handle different numbers of predefined matrices. For example, STAs with less processing capability may be able to use a relatively small, predefined matrix set and STAs with more powerful processing capability may be able to use a relatively large, predefined matrix set. In another example, based on the location of a STA, one set of predefined matrices may provide better performance results than the other set of predefined matrices. Thus, STAs may use some level of flexibility to choose a predefined matrix set from two or more possible predefined matrix sets, in order to improve performance and reduce the processing complexity, as disclosed herein.

Enabling an enhanced sounding protocol may involve enhancing the design of the NDPA frame (e.g., an enhanced NDPA (eNDPA) frame) to accommodate the features defined by the sounding protocol. These features of a sounding protocol that may be indicated in an eNDPA frame may include, but are not limited to: feedback type, NDP format, number of layers included in the CSI feedback, and/or predefined precoder sets. The NDPA design may enable mixed feedback operation of both legacy STAs and advanced STAs, as disclosed herein.

In an example, formats may be defined for index-based Channel State Information (CSI) reports, including VI feedback report or Beam Index feedback report. For example, the index-based reports may be defined in terms of how the index-based report is being encoded, and/or how it is transmitted with signal-to-noise ratio (SNR) values. A MIMO Control field may accommodate the index-based CSI reports, as disclosed herein.

It may be inefficient for the responding STA not to include any feedback in the assigned RUs. There is a need to improve this design to make the channel usage more efficiently. In addition, there is may be a requirement to define a limit on the number of EHT-long training fields (EHT-LTFs) in the transmission. For example, when the beamformer transmits an NDP frame, the maximum number of EHT-LTFs contained in the NDP may need to be defined, as disclosed herein.

Figure 8:
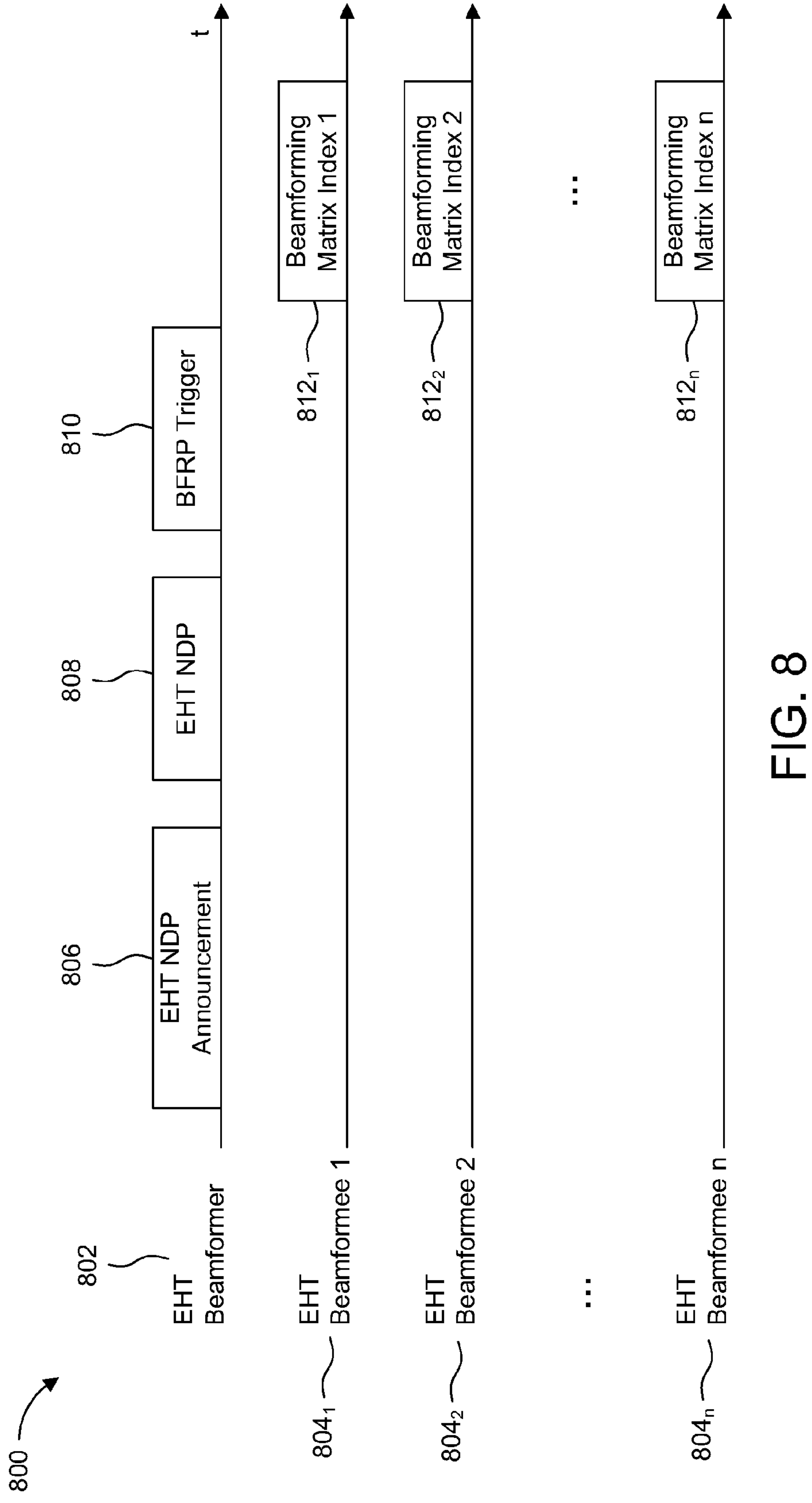
FIG. 8 is a diagram illustrating an example Beamforming Matrix (V) Index (VI) Feedback procedure.

Example mechanisms to reduce the amount of CSI feedback in the Beamforming Report and the reduce beamforming report bits number, with the minimum performance loss, are described herein. FIG. 8 is a diagram illustrating an example Beamforming Matrix (V) Index (VI) Feedback procedure 800. In an example, to reduce the number of report bits, the feedback report can be quantized. Instead of feeding back the elements of the beamforming matrix, the index of the quantized beamforming matrix V may be reported. For example, the quantized precoder matrices, V's, may be predefined and commonly known by the STA and the AP.

With reference to FIG. 8, each (EHT) beamformee (STA) $\mathbf{804}_1$, $\mathbf{804}_2$ . . . , $\mathbf{804}_n$ may receive from (EHT) beamformer 802 (AP or STA) the EHT NDPA frame 806, EHT NDP frame 808 and BFRP TF 810. Based on the received EHT NDP frame 808, each STA$\mathbf{804}_1$, $\mathbf{804}_2$ . . . , $\mathbf{804}_n$ may compute the channel matrix to obtain the matrix $V_{real}$. Each STA $\mathbf{804}_1$, $\mathbf{804}_2$ . . . , $\mathbf{804}_n$ may report the index of the quantized matrix V to the AP 802 by sending beamforming matrix index frames $\mathbf{812}_1$, $\mathbf{812}_2$ . . . , $\mathbf{812}_n$. To determine the index of the quantized matrix V, each STA$\mathbf{804}_1$, $\mathbf{804}_2$ . . . , $\mathbf{804}_n$ may identify which predefined matrix V is correlated to $V_{real}$ most or least. Variant forms of the precoder matrix V may include, but are not limited to: the full Channel State Information (CSI); Full right-singular matrix from singular value decomposition (SVD) of CSI; and/or Compressed CSI (i.e., based on a Givens rotation of right-singular matrix based on SVD of CSI matrix).

The predefined matrices may be a fixed set or a variable set, which may change over time and/or frequency, for example. If the candidates of precoder matrices are changed, the beamformer may notify the beamformee, for example by indicating (e.g., in the NDPA frame) the specific candidate set used in the sounding feedback and/or the number of the candidate precoder matrices. The methods used to identify the reported index may include, but are not limited to: the corresponding matrix V has the highest correlation with $V_{real}$; and/or the difference between the corresponding matrix V and the channel matrix $V_{real}$ is minimum.

Figure 9:
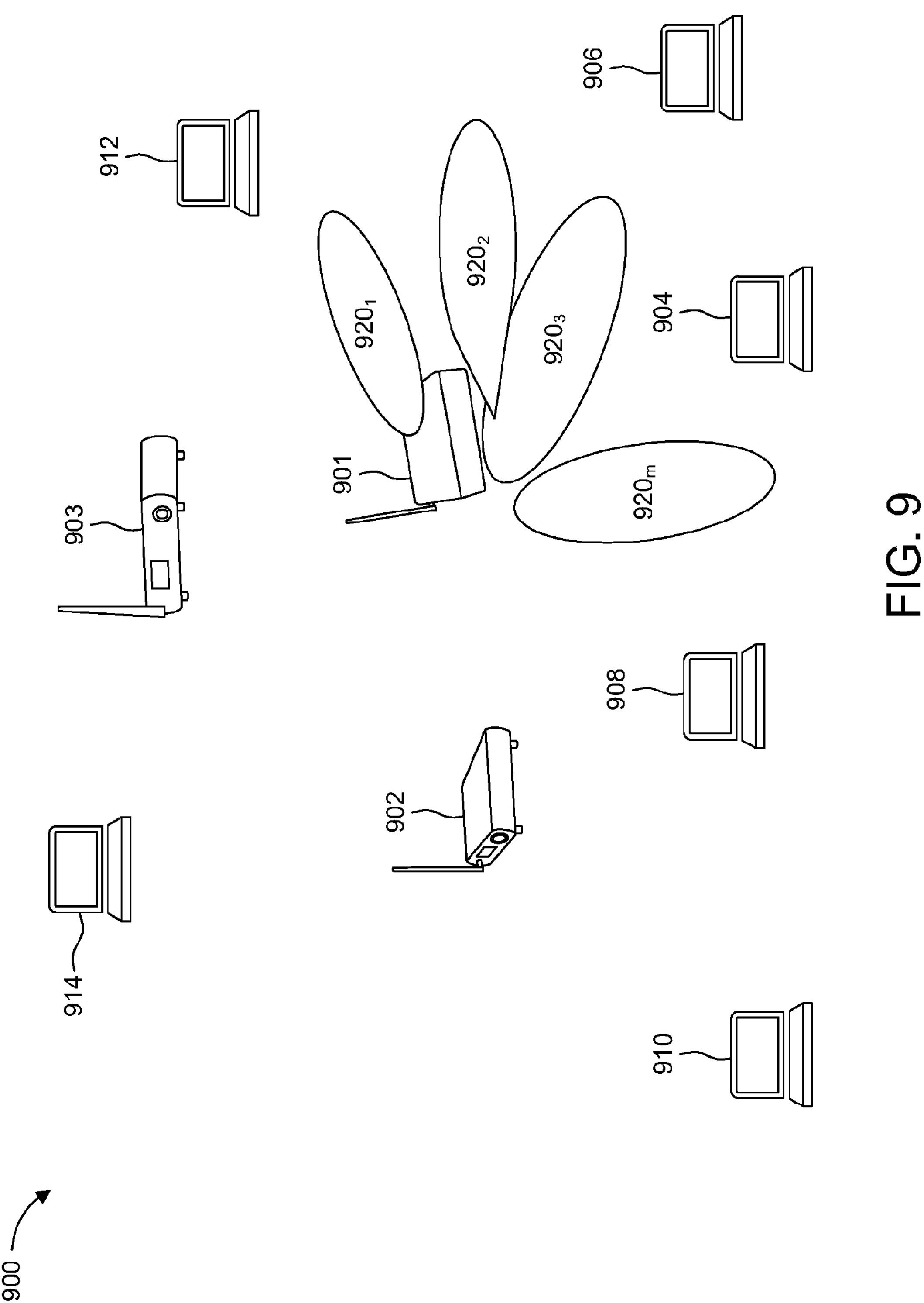
FIG. 9 is a diagram illustrating an example Multi-Beamformed NDP and Best Beam Index Feedback sounding procedure.

Example procedures for Multi-Beamformed NDP and Best Beam Index Feedback sounding are described herein. FIG. 9 is a diagram illustrating an example Multi-Beamformed NDP and Best Beam Index Feedback sounding procedure 900, in a multi-AP network including APs 901, 902, 903 and STA 904, 906, 908, 910 and 912. According to the example sounding procedure 900, the AP 901 may send enabled precoded (e.g., beamformed) NDP frames on corresponding precoded beams 920$_1$, 920$_2$, . . . , 920$_m$. In response to the transmitted precoded NDP frames, a STA 904 may feedback to the AP 901 the index of the best precoder among the precoded beams 920$_1$, 920$_2$, . . . , 920$_m$ received by the STA 904. The number of precoders embedded in an NDP frame can be changed over the time, and may be indicated in NDPA frame. In another example, the STA 904 may feedback to the AP 901 the index of the worst precoder or both the best and the worst precoder (knowledge of the worst precoder at the AP 901 may be useful in the beam nulling case).

Figure 10:
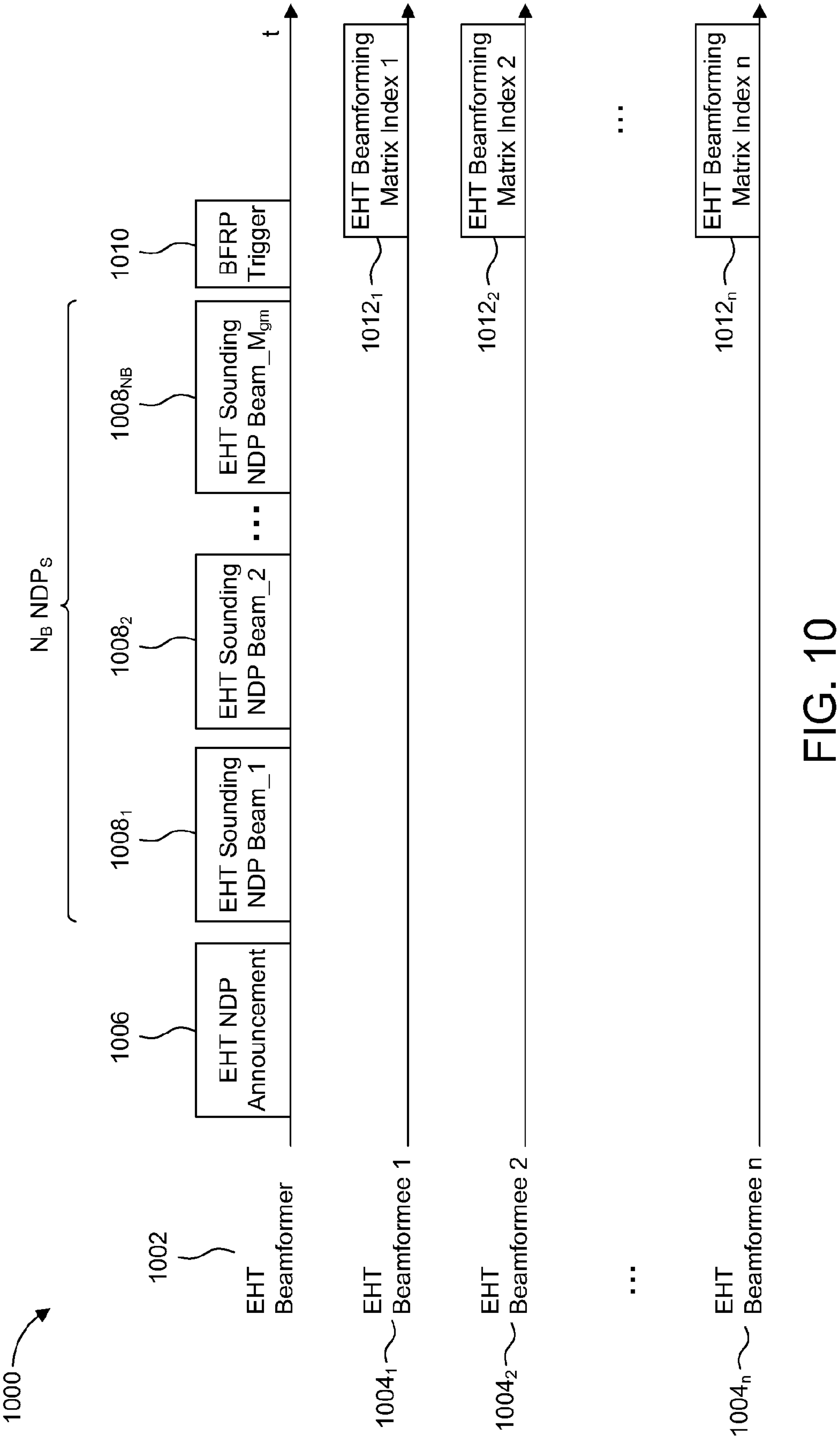
FIG. 10 is a diagram illustrating an example sounding procedure using Individual Beamformed NDP frames with Multi-Beam.

Example NDP structures may be with beamformed NDP procedures, as described herein and illustrated in FIGS. 10-17. FIG. 10 is a diagram illustrating an example use of individual (single) beamformed NDP frames 1008$_1$, . . . , 1008$_{NB}$ with Multi-Beam as part of example sounding procedure 1000.

According to the example sounding procedure 1000, the EHT beamformer 1002 may transmit a (EHT) NDPA frame 1006 to EHT beamformees 1004$_1$, . . . , 1004$_n$. EHT beamformer 1002 may transmit individual precoded/beamformed (i.e., beamformed onto respective beams 1 . . . $Mg_m$) sounding NDP frames 1008$_1$, . . . , 1008$_{NB}$. In other words, each beamformed NDP frame 1008$_1$, . . . , 1008$_{NB}$ may include one precoder. The EHT beamformer 1002 may transmit BFRP TF 1010 to EHT beamformees 1004$_1$, . . . , 1004$_n$. EHT beamformees 1004$_1$, . . . , 1004$_n$ may respond by respectively transmitting to the EHT beamformer 1002 EHT beamforming matrix index frames 1012$_1$, 1012$_2$ . . . , 1012$_n$.

Figure 11:
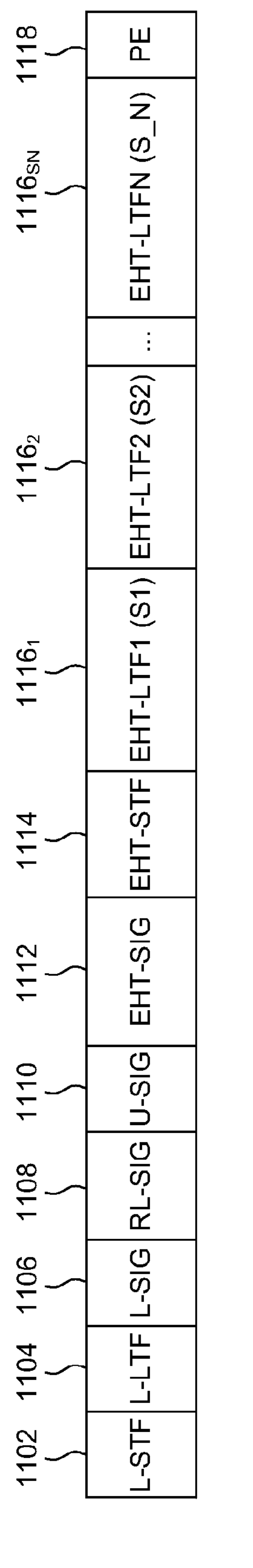
FIG. 11 is a diagram illustrating an example Individual Beamformed NDP frame structure.

FIG. 11 is a diagram illustrating an example individual beamformed NDP frame structure 1100, that may be used in connection with the sounding procedure 1000 of FIG. 10. Beamformed NDP frame structure 1100 may include L-STF field 1102, L-LTF field 1104, L-SIG field 1106, RL-SIG field 1108, U-SIG field 1110, EHT-SIG field 1112, EHT-STF field 1114, EHT-LTF fields 1116$_1$, . . . , 1116$_{SN}$, and PE field 1118. The number SN of EHT-LTF fields 1116$_1$, . . . , 1116$_{SN}$, may be equal to the number of spatial streams, $N_{SS}$, (i.e., $N_{EHT\text{-}LTF}=N_{SS}$). This may be a function of $N_C$, which may be indicated in NDPA frame (e.g., NDPA frame 1006 in FIG. 10). With reference to FIG. 10, the total number of beamformed NDP frames 1008$_1$, . . . , 1008$_{NB}$, $N_B$, may be indicated in NDPA frame. The total number of beamformed NDP frames, $N_B$, may not be fixed and can be changed over the time.

The exemplary precoded EHT symbols in the nth beamformed NDP may be expressed as $$Y^n_{EHT-LTF} = Q_n S_{EHT-LTF} \quad \text{Equation (1)}$$

where $$Q_n = \left[P_1^{(n)}, P_2^{(n)}, \ldots , P_{N_{SS}}^{(n)}\right]$$

is the nth precoder matrix with dimension $M_{TX}\times N_{SS}$, $M_{TX}$ is a function of the number of Tx antennas at beamformee, and $$P_i^{(n)}$$

is ith precoder column vector, $$S_{EHT-LTF} = \begin{bmatrix} S_1 & \ldots & 0 \\ \vdots & \ddots & \vdots \\ 0 & \ldots & S_{N_{SS}} \end{bmatrix}$$

is the diagonal EHT-LTF symbol matrix.

Figure 12:
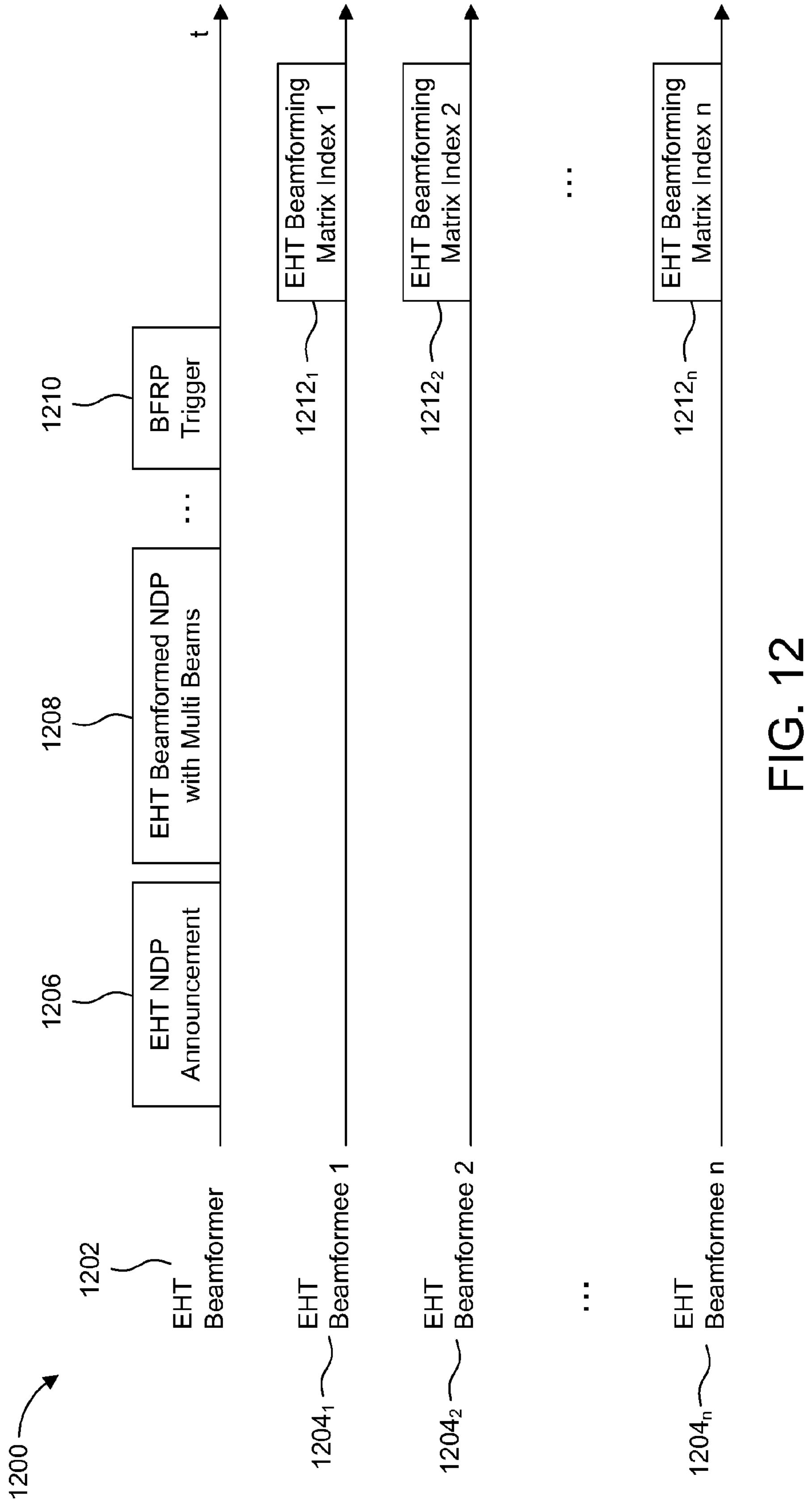
FIG. 12 is a diagram illustrating an example sounding procedure using Single NDP frames with Multi-Beam.

Example sounding procedures using a Single NDP frame with Multi-Beams are described herein. FIG. 12 is a diagram illustrating an example sounding procedure 1200 using of a single NDP frame 1208 with Multi-Beam (i.e., multiple beams). According to the example sounding procedure 1200, the EHT beamformer (AP) 1202 may transmit a (EHT) NDPA frame 1206 to EHT beamformees (STAs) 1204$_1$, . . . , 1204$_n$. EHT beamformer 1202 may transmit NDP frame 1208 carry a greater number, N(EHT-LTF), of EHT-LTFs, where the number $N_{(EHT\text{-}LTF)}$ of EHT-LTFs may be the function of $N_B$ and/or $N_{SS}$. Defining $N_{(EHT\text{-}LTF)}$ may depend on how the EHT_LTF fields are transmitted in the time/frequency/spatial domains. The EHT beamformer 1202 may transmit BFRP TF 1210 to EHT beamformees 1204$_1$, . . . , 1204$_n$. EHT beamformees 1204$_1$, . . . , 1204$_n$ may respond by respectively transmitting to the EHT beamformer 1202 EHT beamforming matrix index frames 1212$_1$, 1212$_2$ . . . , 1212$_n$.

Figure 13:
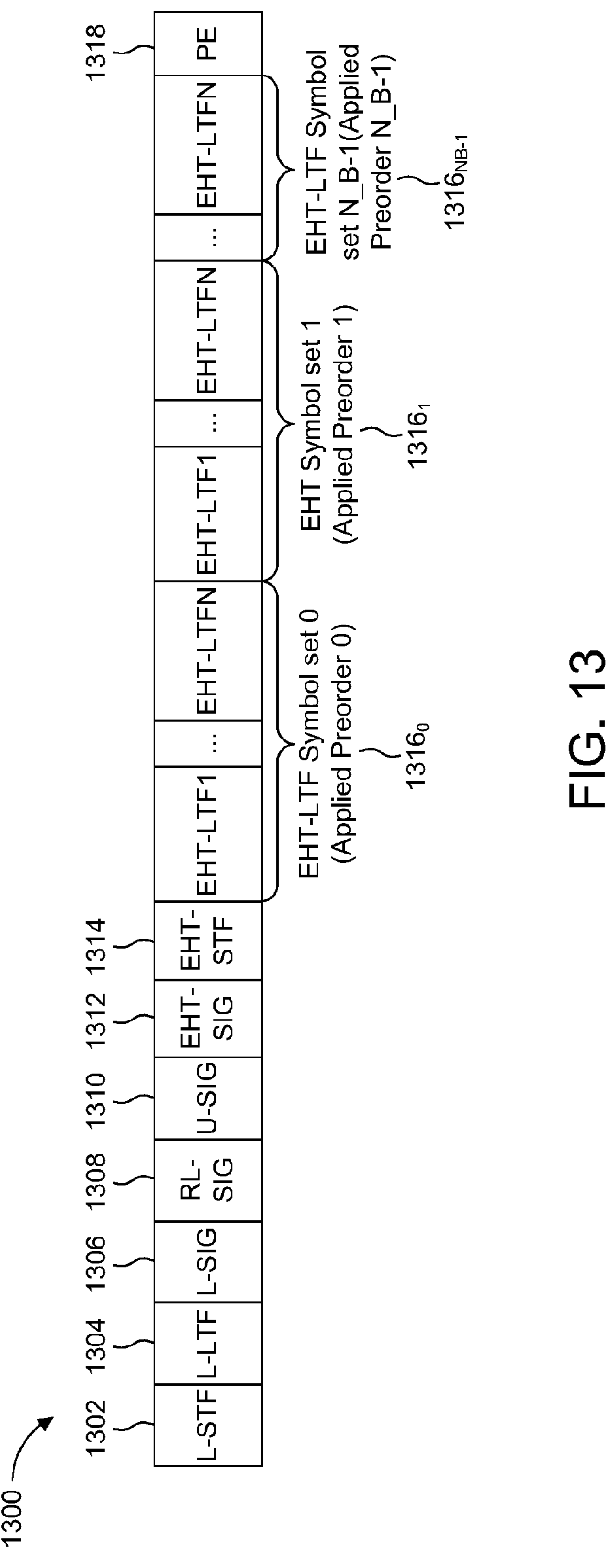
FIG. 13 is a diagram illustrating an example Single NDP frame format with Sequential Multi-Beam.
Figure 14:
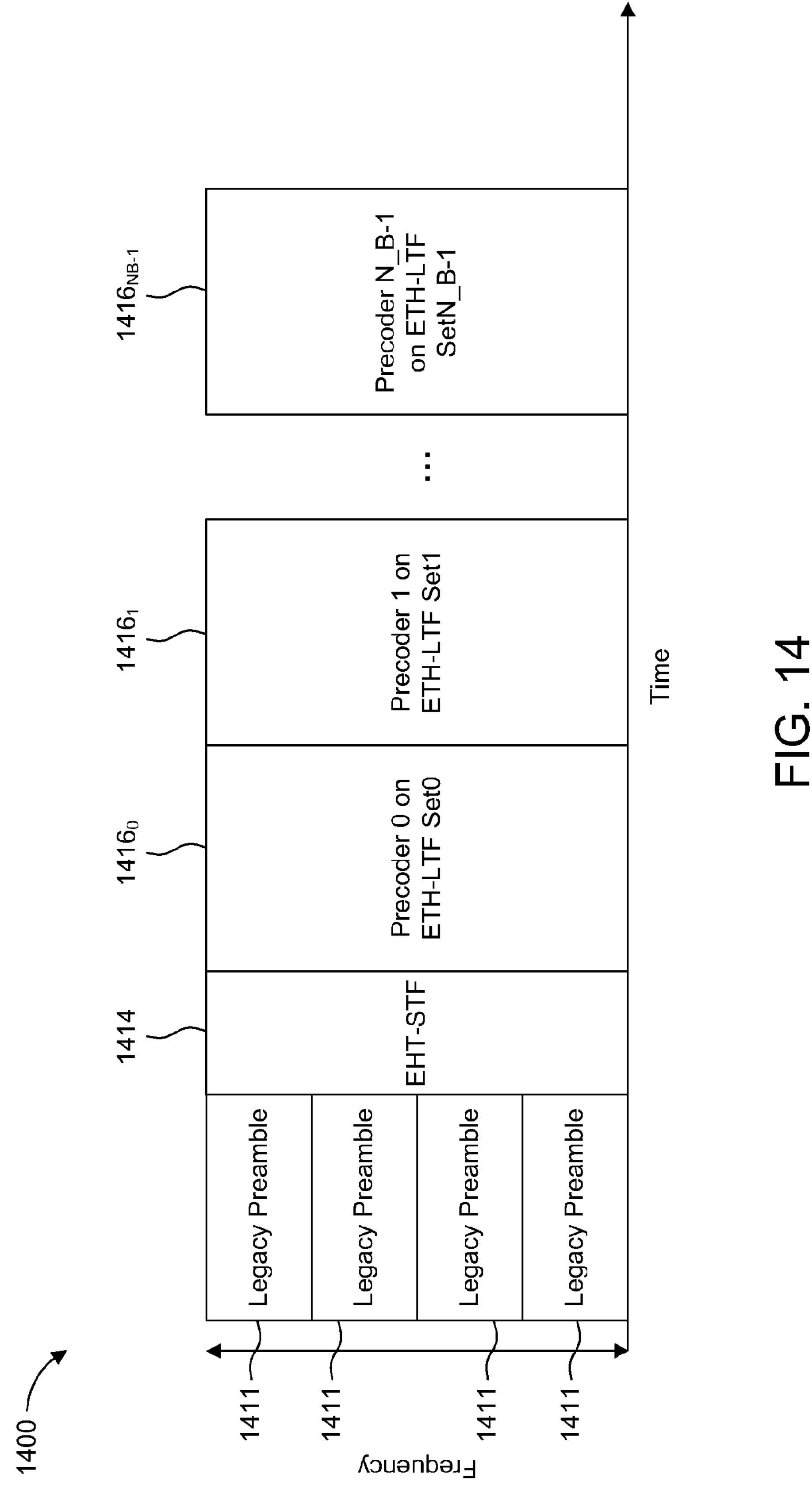
FIG. 14 is a diagram illustrating is a diagram illustrating an example Single NDP frame format with Sequential Multi-Beam in the frequency and time domains.

FIG. 13 is a diagram illustrating an example Single NDP frame format 1300 with Sequential Multi-Beam. NDP frame structure 1300 may include L-STF field 1302, L-LTF field 1304, L-SIG field 1306, RL-SIG field 1308, U-SIG field 1310, EHT-SIG field 1312, EHT-STF field 1314, EHT-LTF symbol sets 1316$_0$, 1316$_{NB-1}$, and PE field 1318. According to Single NDP frame format 1300 with Sequential Multi-Beam, all EHT-LTF symbol sets 1316$_0$, . . . , 1316$_{NB-1}$ are transmitted sequentially in the time domain, such that the number of EHT-LTF fields $N_{EHT\text{-}LTF}=N_{SS}\times N_B$. FIG. 14 is a diagram illustrating an example Single NDP frame format 1400 with Sequential Multi-Beam in the frequency and time domains. NDP frame structure 1400 may include preambles 1411 (e.g., including L-STF field, L-LTF field, L-SIG field, RL-SIG field, and/or U-SIG field etc.), EHT STF-field 1414, and, EHT-LTF fields 1416$_0$, . . . , 1416$_{NB-1}$. EHT-LTF fields 1416$_0$, . . . , 1416$_{NB-1}$ may be transmitted sequentially in the time domain and span the entire frequency band, as shown.

In an example, the nth set of EHT-LTF symbols, which may be precoded by precoder n, $Q_n$, may be expressed as $$Y^n_{EHT-LTF} = Q_n S_{EHT-LTF} \quad \text{Equation (2)}$$

where $$Q_n = \left[P_1^{(n)}, P_2^{(n)}, \ldots , P_{N_{SS}}^{(n)}\right]$$

is the nth precoder matrix with dimension $M_{TX}\times N_{SS}$, $M_{TX}$ is the function of number of Tx antennas at beamformee, and $$P_i^{(n)}$$

is ith precoder column vector. $n \in$ $$\{1, 2, \ldots, N_B\} \cdot S_{EHT-LTF} = \begin{bmatrix} S_1 & \ldots & 0 \\ \vdots & \ddots & \vdots \\ 0 & \ldots & S_{N_{SS}} \end{bmatrix}$$

is the diagonal EHT-LTF symbol matrix.

Figure 15:
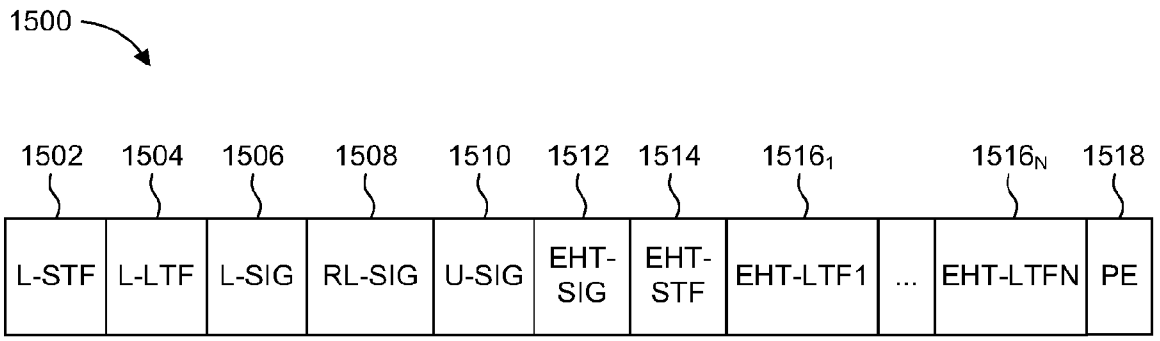
FIG. 15 is a diagram illustrating an example Single NDP frame format with Interleaved Multi-Beam in the frequency domain.
Figure 16:
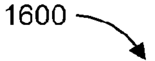
FIG. 16 is a diagram illustrating an example Interleaved Multi-Beam Allocation in the frequency domain.
Figure 16:
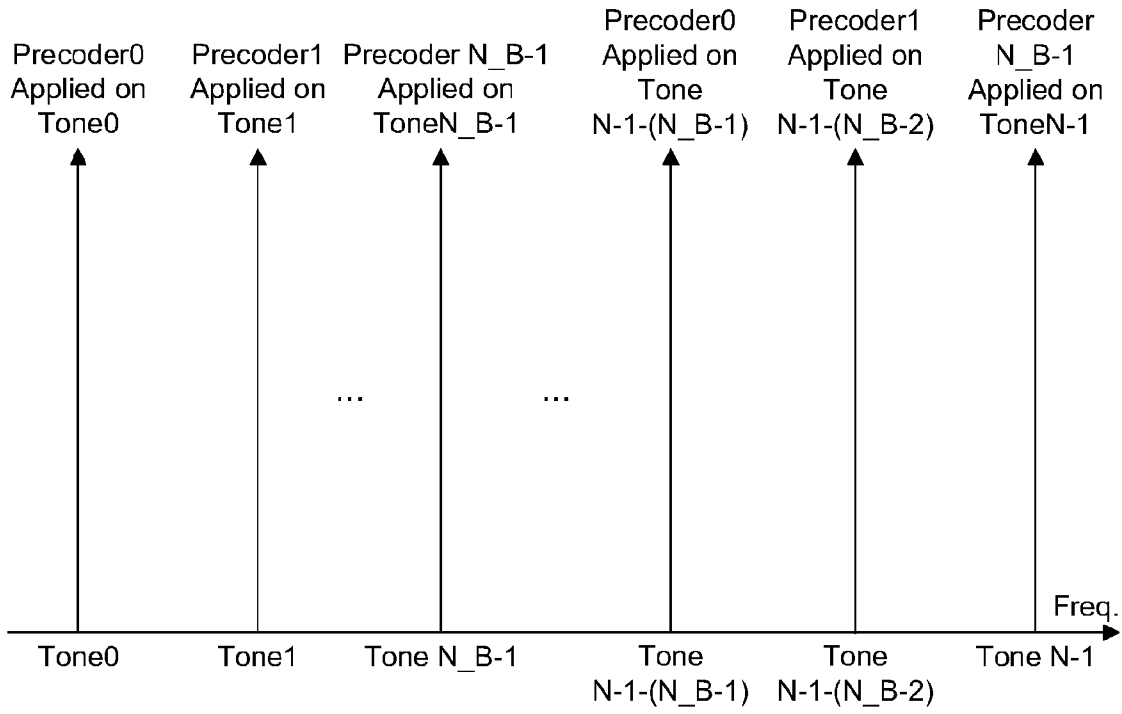
Figure 17:
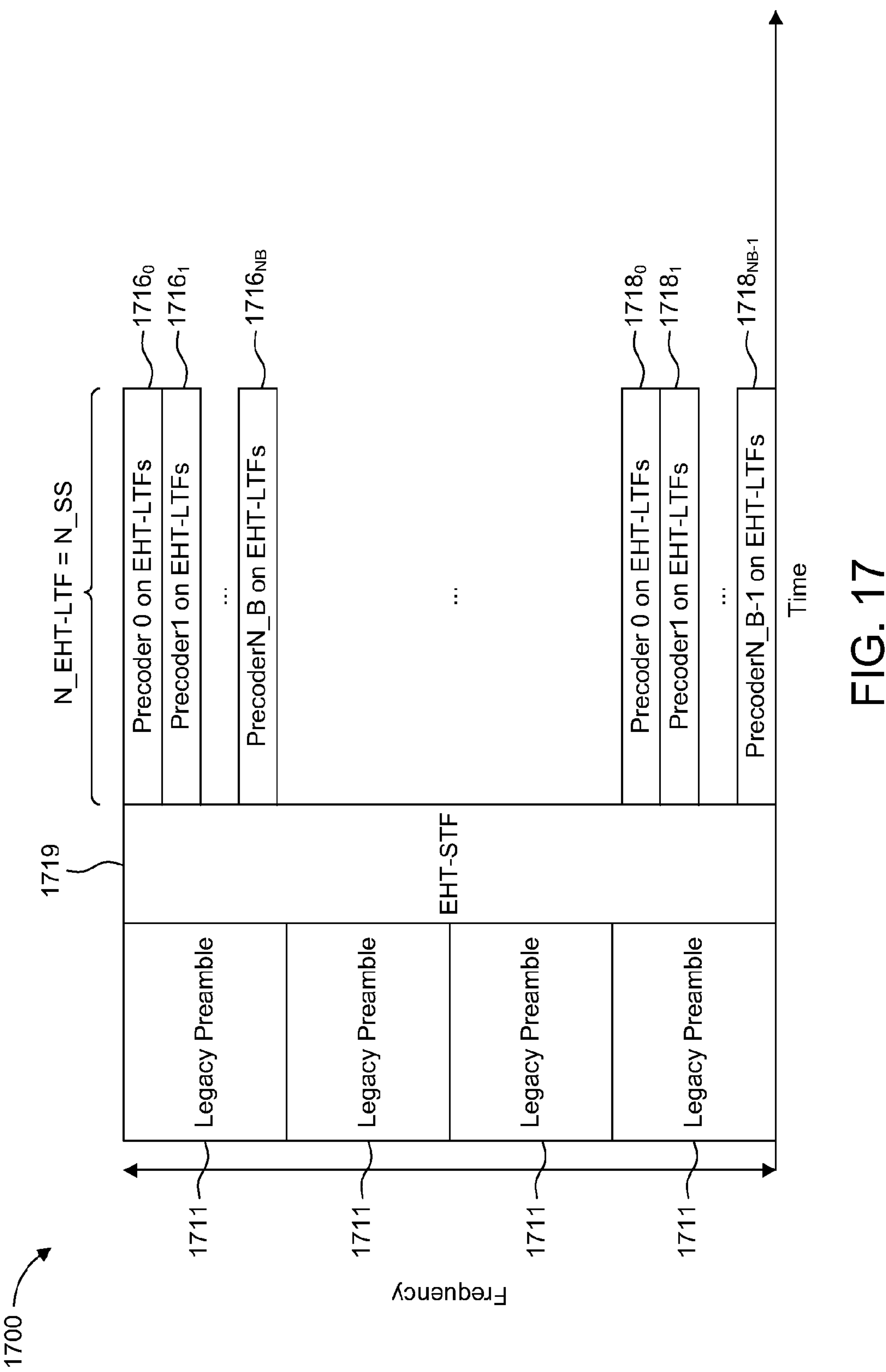
FIG. 17 is a diagram illustrating an Single NDP frame format with Interleaved Multi-Beam in the frequency domain.

FIG. 15 is a diagram illustrating an example Single NDP frame format 1500 with Interleaved Multi-Beam in the frequency domain. NDP frame structure 1500 may include L-STF field 1502, L-LTF field 1504, L-SIG field 1506, RL-SIG field 1508, U-SIG field 1510, EHT-SIG field 1512, EHT-STF field 1514, EHT-LTF fields 1516$_1$, . . . , 1516$_N$, and PE field 1518. For the Single NDP frame 1500 with Interleaved Multi-Beam, EHT-LTF precoded symbols 1516$_1$, . . . , 1516$_N$ with different precoders may be transmitted in the frequency domain alternatively or additionally. FIG. 16 is a diagram illustrating an example Interleaved Multi-Beam Allocation 1600 in the frequency domain, such that EHT-LTF symbols with the same precoder may be transmitted in different tones Tone0, Tone 1, . . . , Tone $N_{B-1}$, . . . , Tone $N-1-N_{B-1}$, Tone $N-1-N_{B-2}$, . . . , Tone $N-1$. FIG. 17 is a diagram illustrating an example Single NDP frame format 1400 with Interleaved Multi-Beam in the frequency domain. NDP frame structure 1700 may include preambles 1711 (e.g., including L-STF field, L-LTF field, L-SIG field, RL-SIG field, and/or U-SIG field etc.), EHT STF-field 1719, and, EHT-LTF fields 1716$_0$, . . . , 1716$_N$B and 1718$_0$, . . . , 1718$_{NB-1}$. The number $N_{EHT-LTF}$ of EHT-LTF fields may be equal to the number of indicated spatial streams, $N_{SS}$. The EHT-LTF sequence in the frequency domain may be generated over the operating bandwidth. The Precoder $Q_n$ to ith data tone of EHT-LTF may be applied, for example, n=mod(i, $N_B$). There may be other variants of the mapping from i to n.

Example procedures for operations with Multiple VI Matrix Sets are described herein. With beamforming VI feedback, a beamformee STA may estimate the channel, correlate/compare the estimated channel with predefined VI matrix set(s), and select one or more matrix indices to feedback to a beamformer STA based on the comparison. Multiple VI Matrix sets may be predefined to better serve STAs with different capabilities and different channel environment. In an example method, the AP and STAs may negotiate the supported and selected VI matrix sets for sounding procedures and precoded transmissions.

In an, one or more VI matrix sets may be predefined, preconfigured or predetermined in the system. Each VI matrix set may include the same or a different number of matrices. One VI matrix set may include different matrices from the other sets. A STA may need to choose one or more VI Matrix Sets for VI feedback. A beamformee STA and a beamformer STA may exchange the VI Matrix Set(s) that they used to each other. In an example, capability signaling may be used to exchange supported VI matrix set information. STAs may exchange the capability information for use until they receive an updated supported VI matrix set information. In an example, dynamic signaling, such as signaling in a control frame, a control field in MAC header in or before a sounding procedure, may be used and the VI matrix set selection may be valid for a sounding period or until further changes.

In an example, VI Matrix Set 1 may carry N1 matrices, VI Matrix Set 2 may carry N2 matrices and so on. N1 may be less than or equal to N2. VI Matrix Set 1 and VI Matrix Set 2 may or may not carry a common subset of matrices. Although two matrix sets are given as an example, the number of Matrix sets may more than two. In another example, one or more matrix sets may be predefined for each layer in the system. In this case, a layer may be a concept related to a number of data streams to transmit. For example, to transmit a single data stream, one-layer of sounding may be sufficient. The predefined VI matrix for one-layer sounding may have size $N_{tx} \times 1$, where $N_{tx}$ is the number of transmit antennas. To transmit two data streams, a two-layer sounding may be used. The predefined VI matrix for two-layer sounding may have size $N_{tx} \times 2$, where $N_{tx}$ is the number of transmit antennas. For example, for Layer 1, VI Matrix Set 11 may carry $N_{11}$ matrices, VI Matrix Set 12 may carry $N_{12}$ matrices and so on where $N_{11} \leq N_{12}$ or $N_{11} < N_{12}$. For Layer 2, Matrix Set 21 may carry N21 matrices, Matrix Set 22 may carry $N_{22}$ matrices and so on, where $N_{21} \leq N_{22}$ or $N_{21} < N_{22}$. Although two matrix sets are given as an example, the number of Matrix sets may more than two.

In an example, a STA may declare its beamforming VI feedback capabilities in a capability information element, for example the EHT Capabilities information element. In an example, the STA may declare that it is able to perform beamforming VI sounding and report beamforming VI feedback. In an example, there may be a Supported VI matrix sets subfield defined in the EHT Capabilities information element. A non-AP STA and an AP STA may indicate one or more supported VI Matrix Sets. In an example, the Supported VI matrix sets subfield may include sets for more than one layers or all the layers. In an example, the Supported VI matrix set field may use bitmap format, where each bit may indicate if the corresponding VI matrix set is supported. In an example, the (EHT) capabilities information element may be carried and transmitted in control frame, data frame, action frame, or any other type of frame such as in a management frame during the (re)association phase, or when the STA wants to change the supported VI matrix sets.

Figure 18:
FIG. 18 is a diagram illustrating an example sounding procedure with VI Matrix Set Indication.

In an example, a STA may support one or more VI Matrix sets, and an AP or a beamformer STA may indicate the VI matrix set to be used for a sounding TXOP. FIG. 18 is a diagram illustrating an example sounding procedure 1800 using VI Matrix Set Indication. According to the example sounding procedure 1800, the EHT beamformer (AP) 1802 may transmit a (EHT) NDPA frame 1806 to EHT beamformees (STAs) 1804$_1$, . . . , 1804$_n$. EHT beamformer 1802 may transmit EHT NDP frame 1808, and BFRP TF 1810 to EHT beamformees 1804$_1$, . . . , 1804$_n$. EHT beamformees 1804$_1$, . . . , 1804$_n$ may respond by respectively transmitting to the EHT beamformer 1802 EHT beamforming matrix index frames 1812$_1$, 1812$_2$ . . . , 1812$_n$. As illustrated in FIG. 18, an AP 1802 or a beamformer STA 1804$_1$, . . . , 1804$_n$ may include VI Matrix Set subfield in the STA Info field in an EHT or later version of NDPA frame 1806. The AP 1802 or the beamformer STA 1804$_1$, . . . , 1804$_n$ may include a special STA Info field identified by a special AID. The special STA Info field may carry the VI matrix set for the sounding for all the beamformee STAs 1804$_1$, . . . , 1804$_n$. A non-AP STA or a beamformee STA 1804$_1$, . . . , 1804$_n$ may check the AID field carried in the STA Info field. If the AID field indicates the STA may be the intended receiver, the non-AP STA or the beamformee STA 1804$_1$, . . . , 1804$_n$ may use the VI matrix set identified in the NDPA frame 1806 to prepare VI feedback. In the beamforming matrix index frames 1812$_1$, 1812$_2$ . . . , 1812$_n$ (Beamforming feedback frame(s), the non-AP STA or the beamformee STA 1804$_1$, . . . , 1804$_n$ may indicate the used VI matrix set in EHT or later version MIMO Control field. For example, one or more bits in the MIMO Control field may be used to identify the VI matrix set used.

In an example, a STA may support one or more VI Matrix sets, and the STA may indicate the preferred VI Matrix set(s) to the beamformer STA/AP. In an example, a Preferred VI Matrix Indication field may be included in a Control field in a MAC header, for example, an A-Control field or other version of Control field. For example, a Control ID value may be assigned for the Preferred VI Matrix report. When the Control ID value indicates the Preferred VI Matrix report, it may indicate that a Preferred VI Matrix Control field is included in the frame. The VI Matrix Control field may indicate one or more preferred VI Matrix set indices. The VI Matrix Control field may indicate one or more preferred layers and/or a preferred VI Matrix set index or more preferred VI matrix indices for each layer. In an example, the transmission of the Preferred VI Matrix Indication field in the Control field in a MAC header may be solicited by the AP using a control frame or management frame. In an example, the transmission of the Preferred VI Matrix Indication field in Control field in MAC header may be unsolicited and together with any frame which includes the Control field.

In an example, a STA may determine to use a VI Matrix set and transmit the VI feedback with VI Matrix set indication. In this way, an AP may not need to assign a VI matrix set to the STA. In the beamforming report frame, the STA may indicate any one or more of the following information: the beamforming report type is a VI report; the VI Matrix Set Index that the STA used for sounding; the best VI matrix indices in the VI Matrix set; and/or the worst VI matrix indices in the VI Matrix set. Because the VI matrix index is a quantized form of channel state information (CSI), in an example, a representation of the chosen VI matrix indices closest to the channel state information may be considered 'best'; a representation of VI matrix indices that are the furthest from the channel state information (or most non-correlated to the channel state information) may be considered 'worst'.

Signaling design for NDPA frame to include Index Based Feedback Report are described herein. Signaling of an enhanced channel sounding scheme may include modifications to the NDPA frame to accommodate the new features. In an example, the beamformer may indicate in the NDPA frame whether the required feedback is legacy feedback (e.g., compressed feedback) or enhanced feedback (e.g., Index-based feedback). A goal of an enhanced channel sounding scheme is to reduce the excessive overhead associated with sending the CSI feedback from the beamformee back to the beamformer. Accordingly, either the legacy feedback or the enhanced feedback may be sent in the same channel sounding session.

Figure 19:
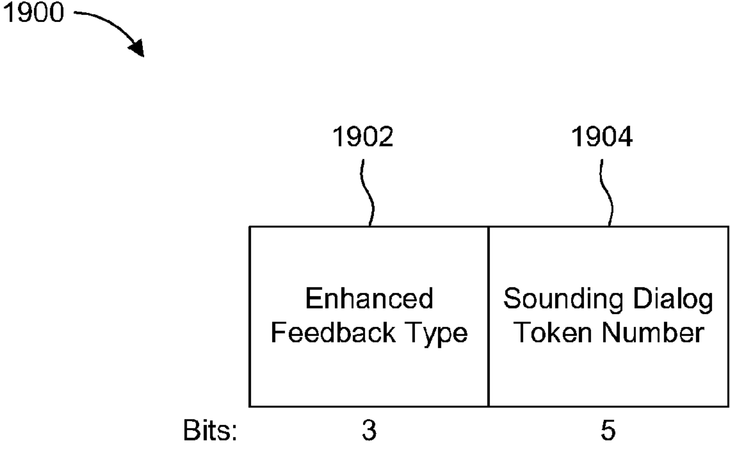
FIG. 19 is a diagram illustrating an example enhanced sounding dialog token format.

In an example, a variant of the NDPA frame (e.g., eNDPA) may be defined with a frame control such that the eNDPA may be used to solicit the enhanced feedback while a legacy NDPA frame may be used as part of a legacy channel sounding procedure. In this case, the format of the eNDPA frame may be compatible with a legacy NDPA frame (such as shown in FIG. 3), and may further include a Sounding Dialog Token field to enable for future compatibility (e.g., new features in the next WLAN generations). FIG. 19 shows an example enhanced sounding dialog token format 1900, which may be included in an NDPA (eNDPA) frame as disclosed herein. The Sounding Dialog Token field 1900 may include two subfields, the Enhanced Feedback Type subfield 1902 and the Sounding Dialog Token Number subfield 1904. In an example, the Enhanced Feedback Type subfield 1902 may be multiple (e.g., 3) bits with the encoding of the subfield indicated in Table 1 (e.g., to enable introduction of other feedback types in next WLAN generations). In an example, the Enhanced Feedback Type subfield 1902 may be 2 bits, as shown in Table 2.

TABLE 1

Example Enhanced Feedback Type Subfield Encoding using 3-bit Encoding

| Entry | Enhanced Feedback Type |
|---|---|
| 000 | Reserved |
| 001 | Precoding Matrix Index |
| 010 | Individual Beamformed NDP |
| 011 | Single NDP with Multi-Beams |
| 100 | Multi-Parts NDP with Multi-Beams |
| 101-111 | Reserved |

TABLE 2

Example Enhanced Feedback Type Subfield Encoding using 2-bit Encoding

| Entry | Enhanced Feedback Type |
|---|---|
| 00 | Precoding Matrix Index |
| 01 | Individual Beamformed NDP |
| 10 | Single NDP with Multi-Beams |
| 11 | Multi-Parts NDP with Multi-Beams |

Figure 20:
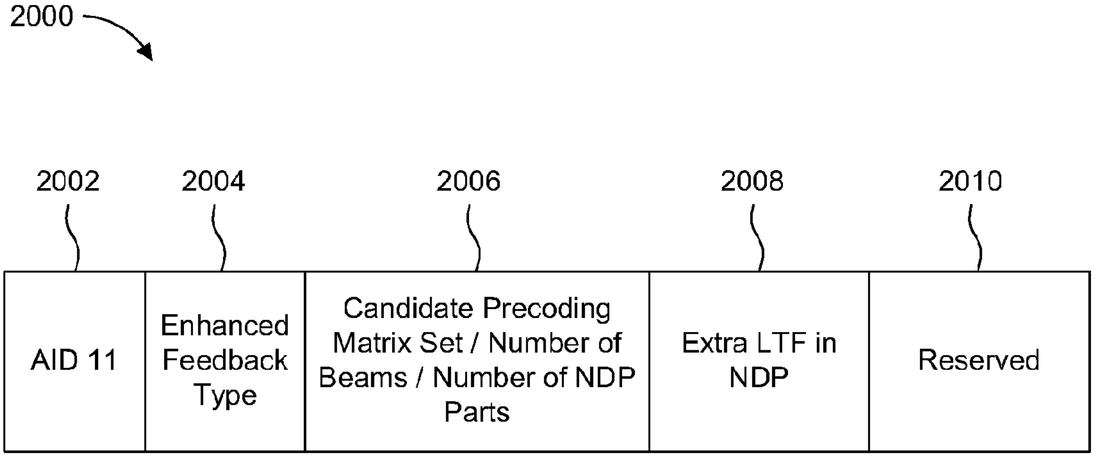
FIG. 20 is a diagram illustrating an example Special STA Info field format, which may be used in an enhanced channel sounding procedure.

FIG. 20 is a diagram illustrating an example Special STA Info field 2000 format, which may be used in an enhanced Channel Sounding procedure as described herein. A Special STA Info field 2000 may include a special AID11 field 2002, for example in a (legacy) NDPA frame (not shown). The Special STA Info field 2000 may be used as a common field in an NDPA frame, such that the presence of this Special STA Info field 2000 may indicate that the corresponding NDPA frame is requesting enhanced feedback (as opposed to legacy feedback). Enhanced sounding parameters signaled in the Special STA Info field 2000 may include, but are not limited to: enhanced feedback type field 2004 (which may indicate for example Precoding or Beamforming Matrix index, Individual Beamformed NDP, Single NDP with Multi-Beams, and/or Multi-Parts NDP with Multi-Beams); a field that may indicate the candidate precoding matrix set/VI matrix set to be used in this channel sounding session, the number of beams in a beamformed NDP, and/or the number of NDP parts; Extra LTF field 2008; and/or a reserved field 2010.

In an example, the reserved field 2010 in the STA Info field 2000 may indicate whether the enhanced feedback or the legacy feedback is requested and the type and parameters of enhanced feedback.

For example, one bit may be named to Enhanced/Legacy Feedback subfield and set to 0 to indicate legacy feedback and set to 1 to indicate enhanced feedback. In another example, two bits may be used to indicate the type of enhanced feedback (e.g., using the two bits encoding of the feedback types in Table 2).

In an example, an EHT variant NDPA frame may be used as a baseline and may include any of the following example modifications. In an example, an EHT variant NDPA frame may include, but is not limited to, any of the following fields (described further below: a modified Sounding Dialog Token field; a STA Info field VI feedback variant; a modified STA Info field with version indication; a modified STA Info field with multiple VI Index feedback; a modified STA Info field with beamformed NDP; a modified STA Info field with VI matrix set indication; and/or a special STA Info field with a special AID.

In an example, a modified Sounding Dialog Token field may have similar format to the Sounding Dialog Token field in FIG. 3, and may have 8 bits. In this case, two bits may be used for VHT/HE/EHT NDPA variant indication, and six bits may be used for Sounding Dialog Token Number. Among the six Sounding Dialog Token Number bits, the Sounding Dialog Token number may use five bits, with one bit (i.e. the VI Feedback Bit) set to a fixed value (e.g., '0') for legacy users (i.e., users not using VI feedback). A VI Feedback Bit set to '1' may indicate that the VI feedback is requested. In an example, all STA Info fields intended for STAs with VI feedback capability may use the STA Info field VI feedback variant when the VI feedback bit is set to '1'. All STA Info fields intended to STAs without VI feedback capability may use the traditional STA Info field (e.g., baseline) when the VI feedback bit is set to '1'. In this case, STAs with VI feedback capability may check the VI feedback bit to determine if its STA Info field is VI feedback variant or baseline. STAs without VI feedback capability may ignore the VI feedback bit and their STA Info fields are baseline version.

Figure 21:
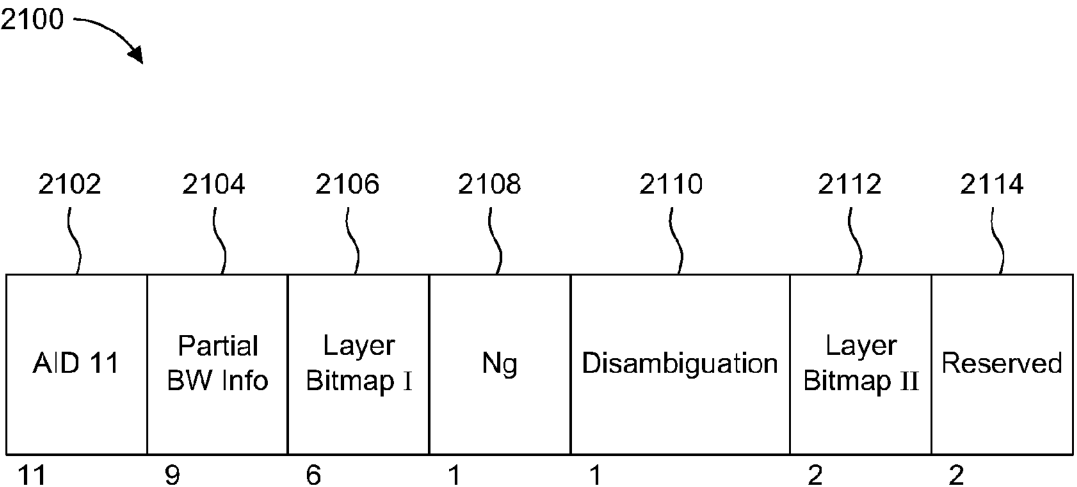
FIG. 21 is a diagram illustrating an example STA Info field format with VI Feedback Variant.

FIG. 21 is a diagram illustrating an example STA Info field with VI Feedback Variant 2100 format, which may be used in an enhanced Channel Sounding procedure as described herein. Example number of bits for each field are shown below the respective fields. STA Info field with VI Feedback Variant 2100 may include, but is not limited to, any of the following fields/subfields: AID11 field 2102, Partial BW Info field 2104, Layer Bitmap I field 2106, Ng field 2108, Disambiguation subfield 2110, Layer Bitmap II 2112, and/or Reserved field 2114. In an example, Layer Bitmap I field 2106 and Layer Bitmap II field 2112 may be used together to indicate the requested VI feedback layers. In an example, an all zero bitmap in Layer Bitmap I field 2106 and/or Layer Bitmap II field 2112 may indicate that the STA may feedback the best VI among all or its selected the layers. The Ng subfield 2108 may indicate the number of subcarriers for which one VI feedback may be requested. It is noted that the order of the subfields shown here is an example and it may be changed in the real system.

Figure 22:
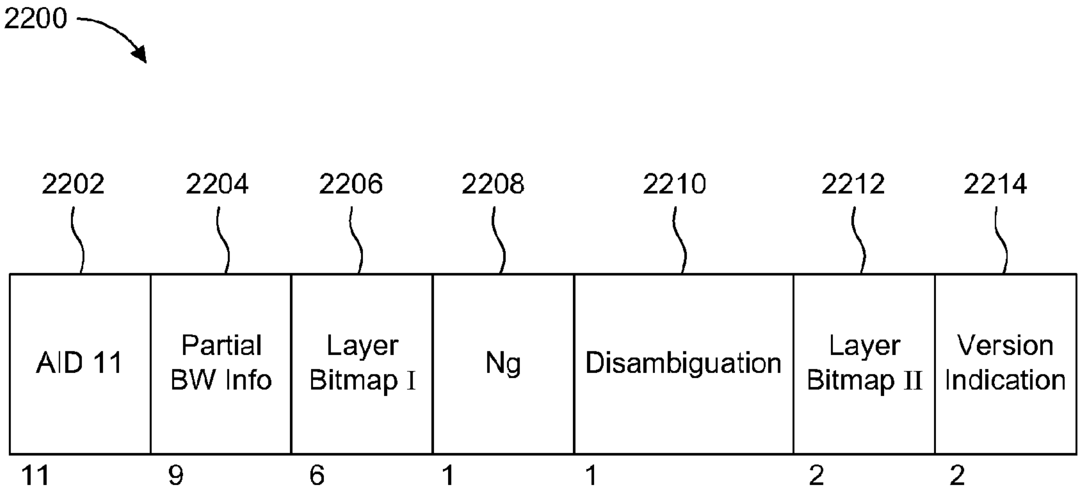
FIG. 22 is a diagram illustrating an example STA Info field format with VI Feedback Variant with Version Indication.

FIG. 22 is a diagram illustrating an example STA Info field VI Feedback Variant 2200 format with Version Indication 2214, which may be used in an enhanced Channel Sounding procedure as described herein. Example number of bits for each field are shown below the respective fields. STA Info field with VI Feedback Variant 2200 may include, but is not limited to, any of the following fields/subfields: AID11 field 2202, Partial BW Info field 2204, Layer Bitmap I field 2206, Ng field 2208, Disambiguation subfield 2210, Layer Bitmap II 2212, and/or Version Indication field 2114 (all fields but the Version Indication field 2114 may function similarly as described in FIG. 21). One or more reserved bits 2214 (i.e., the version indication 2214) in the baseline STA Info field 2200 may be used to indicate future/additional feedback versions. Depending on the value carried in the Version Indication field 2214, the modified STA Info field 2200 may have different format/variant. For example, one value of the Version Indication field 2214 may indicate the requested feedback may be VI feedback. The STA Info field 2200 may use VI feedback variant format as shown in FIG. 22.

For the modified STA Info field with multiple VI Index feedback, in some examples (e.g., beam nulling in MAP scenario), some beam direction may need to be avoided. Therefore, the AP may request the worst channel index and the best channel index.

Figure 23:
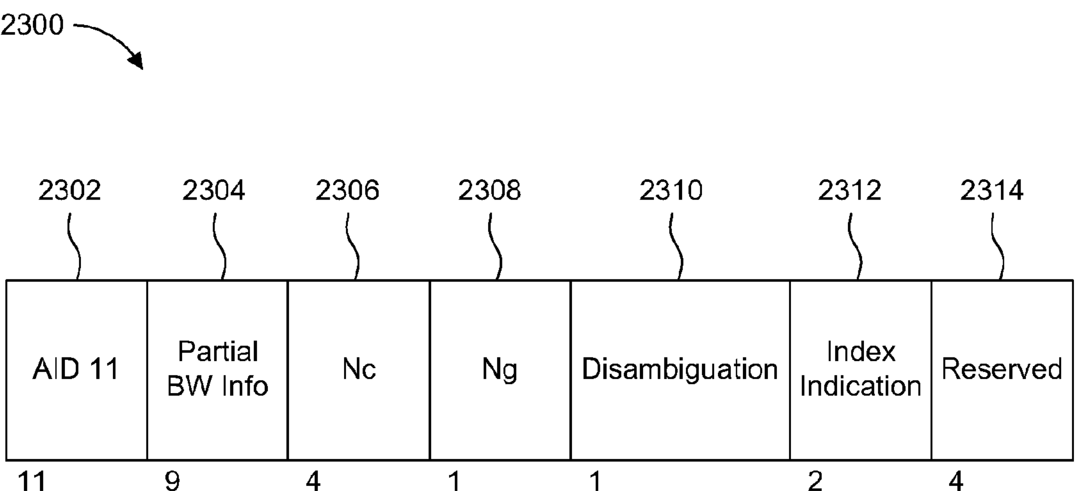
FIG. 23 is a diagram illustrating an example STA Info field format with VI Feedback Variant with Index Indication.

FIG. 23 is a diagram illustrating an example STA Info field VI Feedback Variant 2300 format with Index Indication 2312, which may be used in an enhanced Channel Sounding procedure as described herein. Example number of bits for each field are shown below the respective fields. STA Info field with VI Feedback Variant 2300 may include, but is not limited to, any of the following fields/subfields: AID11 field 2302, Partial BW Info field 2304, Nc 2306, Ng field 2308, Disambiguation subfield 2310, Index Indication field 2312, and/or Reserved field 2314 (like fields may be as described above, unless otherwise indicated). Index Indication field 2312 may indicate if the STA Info field with VI Feedback Variant 2300 requests the best VI feedback or the worst VI feedback or both. An example of Index Indication Subfield format given in Table 3.

TABLE 3

Example Index Indication Subfield format for VI Feedback Variant

| Bits | Representation |
|---|---|
| 00 | Best VI only |
| 01 | Worst VI only |
| 10 | Best VI and worst VI |
| 11 | Reserved |

Figure 24:
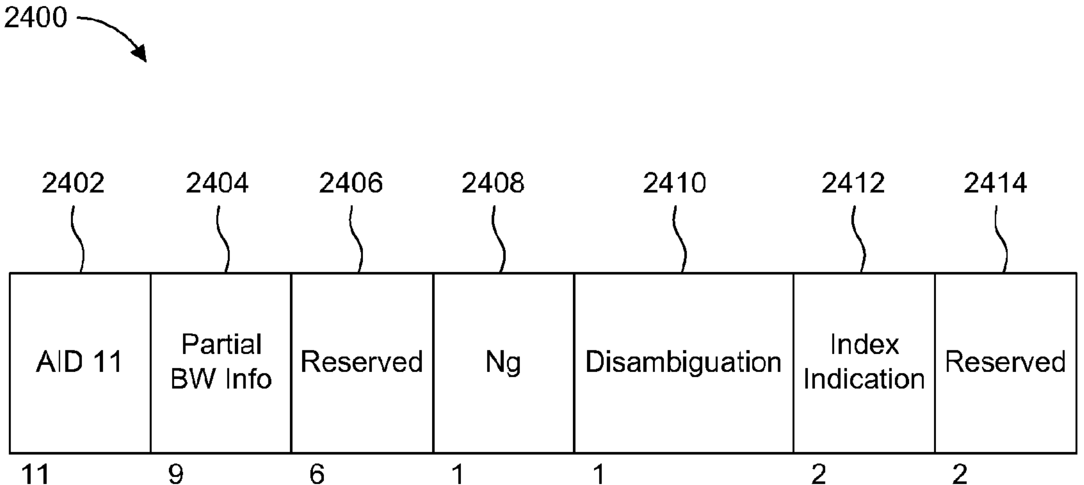
FIG. 24 is a diagram illustrating an example STA Info field format with VI Feedback Variant for a Beamformed NDP frame.

FIG. 24 is a diagram illustrating an example STA Info field VI Feedback Variant 2400 format for a Beamformed NDP frame. The STA Info field 2400 accommodate feedback due to the transmission of the beamformed NDP frame. STA Info field with VI Feedback Variant 2400 may include, but is not limited to, any of the following fields/subfields: AID11 field 2402, Partial BW Info field 2404, Reserved 2406, Ng field 2408, Disambiguation subfield 2410, Index Indication field 2412, and/or Reserved field 2414 (like fields may be as described above, unless otherwise indicated). Index Indication subfield 2412 may indicate what index type is requested, for example using the example format given in Table 4.

TABLE 4

Example Index Indication Subfield format for Beamformed NDP

| Bits | Representation |
|---|---|
| 00 | Best Beam Index only |
| 01 | Worst Beam Index only |
| 10 | Best Beam Index and worst Beam Index |
| 11 | Reserved |

Figure 25:
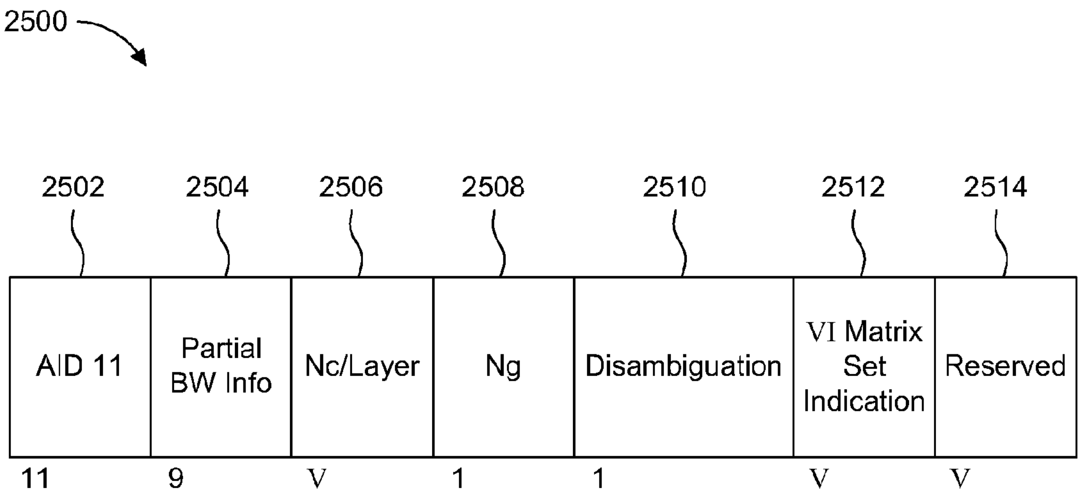
FIG. 25 is a diagram illustrating an example STA Info field format with VI Feedback Variant with VI Matrix Set Indication.

FIG. 25 is a diagram illustrating an example STA Info field VI Feedback Variant 2500 format with VI Matrix Set Indication 2512. STA Info field with VI Feedback Variant 2500 may include, but is not limited to, any of the following fields/subfields: AID11 field 2502, Partial BW Info field 2504, Reserved 2506, Ng field 2508, Disambiguation subfield 2510, VI Matrix Set Indication field 2512, and/or Reserved field 2514 (like fields may be as described above, unless otherwise indicated). In a system with multiple VI Matrix sets predefined, a beamformer may request a beamformee to use the VI Matrix Set identified in the VI Matrix Set Indication field 2512 to perform VI beamforming sounding and feedback.

In another example, a special STA Info field (such as any of the examples given above) may further include common information to all the intended STAs and identified by a special AID that is reserved. The information carried in the special STA Info field may apply to all the STAs or any subset of STAs. Any abovementioned methods and signaling fields/subfields (e.g., described in FIGS. 20-25) may be used in any combination or sub-combination.

Figure 26:
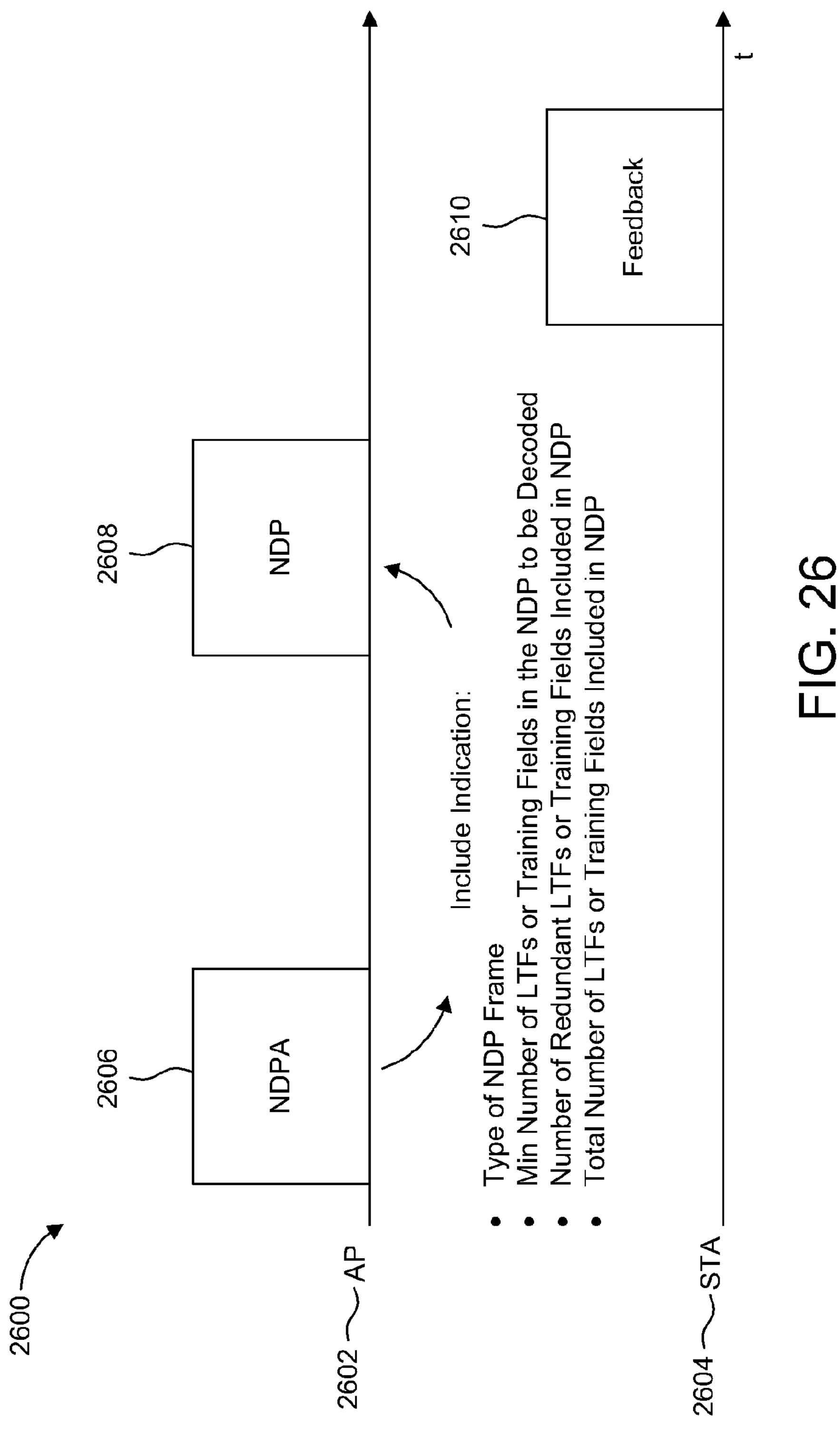
FIG. 26 is a diagram illustrating an example NDP Sounding procedure.

Example NDPA NDP frame and sounding protocol designs are described herein. FIG. 26 is a diagram illustrating an example NDP Sounding procedure 2600, where an EHT beamformer (AP) may send an NDPA frame 2606 followed by an NDP frame 2608 to at least one EHT beamformee (STA), where the STA may measure the channel based on the received NDP frame 2608 send channel feedback 2610 to the AP accordingly. In an example, the NDPA frame 2606 may indicate: type of NDP frame; minimum number of LTF fields or training fields in the upcoming NDP frame to be decoded; Number of Redundant LTFs or Training Fields Included in NDP frame; and/or Total Number of LTFs or Training Fields Included in NDP frame. In an example, the NDP PPDU 2608 used for sounding may include a number of LTF fields or other type of training fields. The LTF fields or other type of training fields may be used for channel estimation or other type of sounding, which may be used for MIMO or SU-MIMO or MU-MIMO sounding. In order to allow for STAs more processing time, the NDP frame 2608 or other type of sounding frames used for sounding may include additional LTF or training field that may be strictly necessary for the number of spatial steams used for the sounding. For example, if the NDP frame 2608 is used for a four spatial stream sounding, the NDP frame 2608 may include 8 LTF fields.

In an example, an NDPA frame may include, but is not limited to include, any one or more of the indications (as described further below): type of NDP frames, total number of LTF or training field, min Number of LTF or training field to be received, and/or number of redundant LTF or training fields. The indication of the type of NDP frames may indicate whether the NDP frames or other training frames may include additional LTF fields or training fields. In an example, the type NDP frames may indicate that additional LTF fields or training fields may be used for higher number of spatial streams. For example, a total y LTF fields or training fields may be included to conduct sounding for y spatial streams (e.g., y=8). In another example, the type NDP frames may indicate that the additional LTF fields or training fields may be included for refining the channel sounding and estimation and may be skipped for STAs that have less processing power. For example, a total of 16 LTF or training fields are included in the NDP frame, however, sounding may be conducted on only 8 spatial streams, while the additional 8 LTF or training fields may be skipped by STAs that are training for 8 spatial streams, and STAs with higher processing power may use the additional 8 LTF or training fields to further refine the channel estimation. The total number of LTF or training fields may be indicated in the NDP frames. The minimum number of LTF or training fields may be received at a STA participating in the sounding. The number of additional LTF or training fields may be indicated in the NDP or sounding frame.

In an example, an NDP frame (transmitted following the NDPA frame) may include, but is not limited to include, any one or more of the indications (as described further below): an indication which type of NDP frame it is including, an indication of Total number of LTF or training field, an indication of Min Number of LTF or training field to be received, an indication of Number of redundant LTF or training fields included in the NDP frame, LTF or training fields.

For the indication which type of NDP frame it is including, in an example, the NDP Type field may indicate that additional LTF fields or training fields may be used for higher number of spatial streams. For example, total 8 LTF fields or training fields may be included to conduct sounding for 8 spatial streams, while the current sounding and feedback may be for 4 spatial streams. In another example, the NDP type may indicate that the additional LTF fields or training fields may be included for refining the channel sounding and estimation and may be skipped for STAs that have less processing power. For example, a total of 16 LTF or training fields are included in the NDP frame, however, sounding is conducted for 8 spatial streams, while the additional 8 LTF or training fields may be skipped by STAs that are training for 8 spatial streams, and STAs with higher processing power may use the additional 8 LTF or training fields to further refine the channel estimation. The indication may be included in the PHY header or other fields.

For the indication of Total number of LTF or training field, the total number N of LTF or training fields may be included in the NDP frames. The indication may be included in the PHY header or other fields. For the indication of Min Number of LTF or training field to be received, the minimum number M of LTF or training fields is received at a STA participating in the sounding. The indication may be included in the PHY header or other fields. For the indication of Number of redundant LTF or training fields included in the NDP frame, the number (N−M) of additional LTF or training fields may be included in the NDP or sounding frame. The indication may be included in the PHY header or other fields.

For the LTF or training fields, the NDP frame may include the total number of LTF or training fields as indicated in the NDPA frame and/or NDP frame. If the type of NDP frame indicated is for higher number of spatial streams, it may include LTF or training fields that are multiplexed by orthogonal matrices, such as P-matrix, of the size N×N. If the type of NDP frame indicated is that the additional LTF fields or training fields may be included for refining the channel sounding and estimation and may be skipped for STAs that have less processing power, the first M number of LTF or training fields may be multiplexed by orthogonal matrices, such as P-matrix, of size M×M. The (N−M) additional or redundant LTF or training fields may be multiplexed by orthogonal matrices, such as P-matrices, of size (N−M)×(N−M).

A STA participating in the sounding may receive the NDPA and NDP fields that include the indications as described above, and may follow any of the following procedures. For example, if the NDPA or NDP frames include indication that the NDP frame includes additional LTF fields or training fields may be included for refining the channel sounding and estimation and may be skipped for STAs that have less processing power, if the STA has lower computational power, it may only receive the first M LTF or training fields and stop receiving the additional LTF or training fields. The receiving STA may use an orthogonal matrices, such as a P-matrix, of size M×M, to estimate the channels for the M spatial streams. If the receiving STA has high computational power, it may continue to receive the additional (N−M) LTF or training fields. The receiving STA may use an orthogonal matrices, such as a P-matrix, of size (N−M)×(N−M), to further refine the channel estimation for the M spatial streams. Otherwise, the STA may proceed to receive all LTF or training fields using orthogonal matrices, such as P-matrix, of size N×N, to conduct channel estimation for N spatial streams.

Example procedures and formats for enhanced Compressed Beamforming/CQI frame are described herein. Enhanced Compressed Beamforming/CQI frame may be used to carry VI beamforming feedback information. In an example, the enhanced Compressed Beamforming/CQI frame may use EHT Compressed Beamforming/CQI frame as baseline with additional information identified to carry VI beamforming feedback information such as an enhanced MIMO Control field and a VI Beamforming Report may be added. In an example, the enhanced Compressed Beamforming/CQI frame may include the information shown in Table 5.

TABLE 5

Exemplary design for Enhanced Compressed Beamforming/CQI frame Action field values

| Value | Meaning |
|---|---|
| 1 | Category |
| 2 | EHT Action |
| 3 | EHT MIMO Control |
| 4 | EHT Compressed Beamforming Report |
| 5 | EHT MU Exclusive Beamforming Report |
| 6 | EHT CQI Report |
| 7 | Enhanced MIMO Control |
| 8 | VI Beamforming Report |

Figure 27:
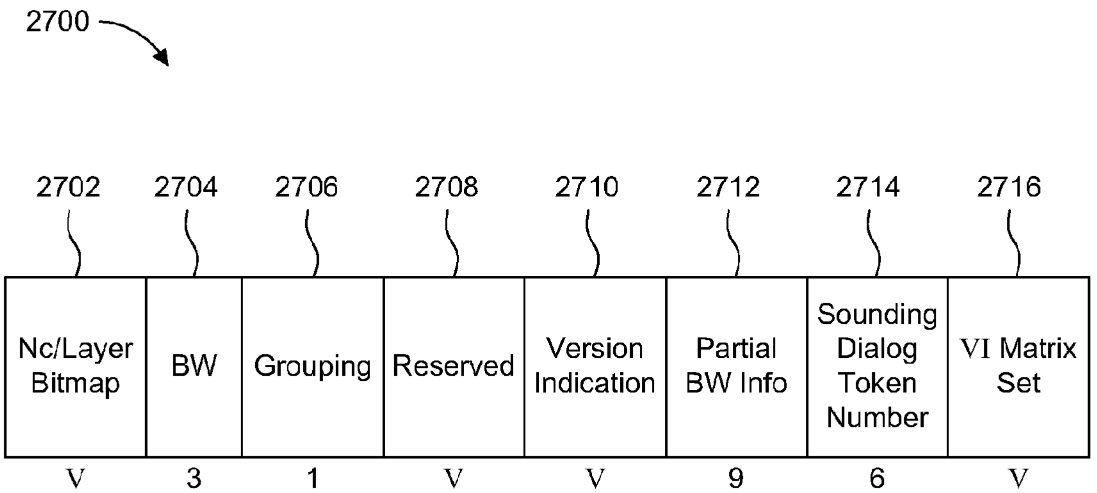
FIG. 27 is a diagram illustrating an example EHT Multi-input and Multi-output (MIMO) Control field format with VI Feedback Variant or enhanced MIMO Control field.

FIG. 27 is a diagram illustrating an example EHT Multi-input and Multi-output (MIMO) Control field 2700 format VI Feedback Variant or enhanced MIMO Control field. Enhanced MIMO Control field 2700 may be carried in Beamforming feedback frames (not shown), such as EHT Compressed Beamforming/CQI frame or later version of Compressed Beamforming/CQI frame. Enhanced MIMO Control field 2700 may include, but is not limited to, any of the following fields/subfields: Nc/Layer Bitmap field 2702, BW field 2704, Grouping field 2706, Reserved field 2708, Version Indication field 2710, Partial BW Info subfield 2712, VI Sounding Dialog Token Number field 2714, and/or VI Matrix Set field 2716 (like fields may be as described above, unless otherwise indicated). In an example, an enhanced MIMO Control field 270 may use an EHT MIMO Control field as baseline with additional information for VI feedback. For example, one or more reserved bits in an EHT MIMO Control field 2700 may be used for Version Indication Field 2710 and the EHT MIMO Control field 2700 may have different format with different version. In an example, an enhanced MIMO Control field 2700 may be introduced with a new format.

The version Indication subfield 2710 may indicate the feedback types. One value may be used to indicate VI feedback. When the Version Indication subfield indicates the VI feedback variant, the MIMO Control field 2700 may be a MIMO Control field VI feedback variant. The Layer Bitmap subfield 2702 may indicate the layers related to the VI feedback. For example, a STA may report the best VI matrix index for layer 1 and layer 2, then the STA may indicate in the layer bitmap that layer 1 and layer 2 reports may be included. The VI Matrix Set subfield 2716 may indicate VI Matrix Set(s) that the STA used for sounding and feedback. In the case multiple layers are indicated, multiple VI matrix sets may be included.

Example procedures and formats for VI Beamforming Reports are described herein. A VI Beamforming report may include VI matrix indices for one subcarrier among Ng subcarriers from lowest frequency to highest frequency. The size of each VI matrix index may depend on the size of predefined/selected VI matrix set. For example, if VI Matrix set includes 8 matrices, then 3 bit may be used to indicate one VI matrix index. Table 6 shows an example of fields that may be included in an enhanced VI Beamforming Report Information format. Table 6 shows that averaged SNR information and index information may be included. Depending on the request on NDPA, for example, STA Infor field of NDPA, the number of index values included in the VI Beamforming Report may vary. For example, if only one layer (=Nc) is indicated, then there are up to Nc Average SNR values are reported with 8 bits for each value. If only best Index is requested, then one Index value corresponding to Nc-layer precoder set is reported. If both the best Index and the worst Index are reported, then two Indices, including the best and the worst Indices are reported. If two layers are indicated (i.e. $Nc_1$ and $Nc_2$), then there may be up to $Nc=max(Nc_1, Nc_2)$. Average SNR values may be reported with 8 bits for each value If only best Index is reported, then two indices values corresponding to Nc1-layer precoder set and Nc2-layer precoder set may be reported. If both the best Index and the worst Index are reported, then four Index values may be included.

TABLE 6

Example Enhanced VI Beamforming Report Information (for 8 Matrices in the VI matrix set)

| Field | Size (bits) | Meaning |
|---|---|---|
| Avg. SNR of Spatial Stream 1 | 8 | Signal-to-noise ratio at the beamformee for spatial stream 1 averaged over all data subcarriers. |
| . . . | . . . | . . . |
| Avg. SNR of Spatial Stream Nc, Nc = $max(Nc_1, Nc_2)$ if two Nc's (layer values) are indicated in NDPA frame otherwise Nc is the layer value indicated in the first layer bitmap | 8 | Signal-to-noise ratio at the beamformee for spatial stream Nc averaged over all data subcarriers. |
| Index1 | 3 | The best index for the precoder set with Nc1 layers |
| Index 2 | 3 | The best index for the precoder set of Nc2 layers (if the $2^{nd}$ Layer bitmap have the valid values in in NDPA frame) |

Example procedures and formats for for Beam Index Beamforming Report are described herein. A Beam Index Beamforming report may include one or more index values for one subcarrier among Ng subcarriers from lowest frequency to highest frequency. The size of each Beam index may depend on the size of precoders/beams applied on NDP(s). For example, if eight precoders are applied on NDP(s), then 3 bit may be used to indicate one Beam Index. Table 7 shows an example of fields that may be included in an the enhanced Beam Index Beamforming Report Information. Table 7 shows that averaged SNR information and index information are included. Depending on the request on NDPA, for example, a STA Infor field of NDPA, the number of index values included in the Beam Index Beamforming Report may vary. For example, If the best index is requested, then one index value may be included. If the worst index is requested, then one index value may be included. If both the best index and the worst index are requested, then two index values may be included. If AP decides to request the best and $2^{nd}$ best index, then two index values may be included.

TABLE 7

Exemplary Enhanced Beam Index Beamforming Report Information (8 precoders applied in NDP)

| Field | Size (bits) | Meaning |
|---|---|---|
| Avg. SNR of Spatial Stream 1 | 8 | Signal-to-noise ratio at the beamformee for spatial stream 1 averaged over all data subcarriers. |
| . . . | . . . | . . . |
| Avg. SNR of Spatial Stream Nc | 8 | Signal-to-noise ratio at the beamformee for spatial stream Nc averaged over all data subcarriers. |
| Index1 | 3 | The best index of the precoded EHT-LTFs |
| Index 2 | 3 | The worst index of the precoded EHT-LTFs if it is requested by AP |

Figure 28:
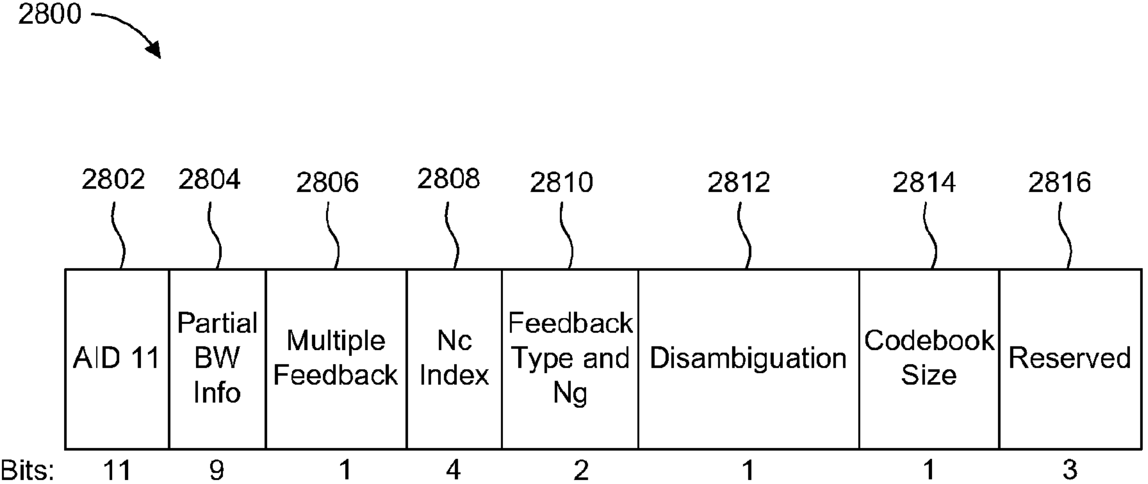
FIG. 28 is a diagram illustrating an example STA Info field format in an EHT NDP Announcement frame variant.

Examples methods to improve the efficiency of sounding feedback and define number of EHT_LTF symbols for transmission are described herein. FIG. 28 illustrates an example STA Info field 2800 format in an EHT NDP Announcement frame variant. STA Info field 2800 may include, but is not limited to, any of the following fields/subfields: AID11 field 2802, Partial BW Info field 2804, Multiple Feedback field 2806, Nc Index field 2808, Feedback Type and Ng subfield 2810, Disambiguation field 2812, Codebook Size Field 2814, and/or Reserved field 2816 (like fields may be as described above, unless otherwise indicated).

In an example, one or more bits (e.g., one reserved bit) in the STA Info field 2800 of the EHT NDPA frame can be used to indicate if NDPA frame the allows the partial Beamforming report or not. In other words, this bit may be used to enable the non-AP STA to send the feedback report in multiple separate PPDUs when the STA receives the NDP. For example, as illustrated in FIG. 28, Bit 20 is used as the Multiple Feedback indication 2806. For example, Multiple Feedback indication 2806 (e.g., Bit 20 of the frame) equal '1' may represent that the AP allows the non-AP STA to send back the compressed beamforming feedback and any multi-user (MU) exclusive beamforming report information in multiple separate PPDUs for the same NDP. when Multiple Feedback indication 2806 (e.g., Bit 20 of the frame) equal '0' may represent that the AP does not allow the non-AP STA to send back the compressed beamforming feedback and any MU exclusive beamforming report information in multiple separate PPDUs.

Figure 29:
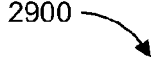
FIG. 29 is a diagram illustrating an example EHT MIMO Control field format including Index of Multiple Feedbacks.
Figure 29:
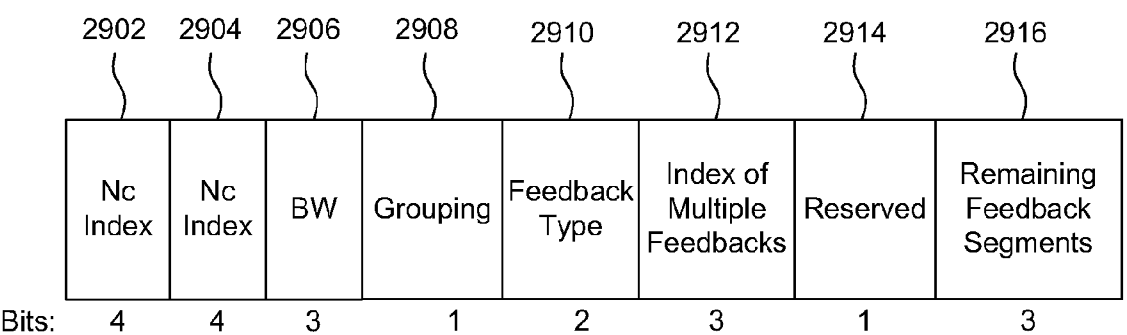
Figure 29:
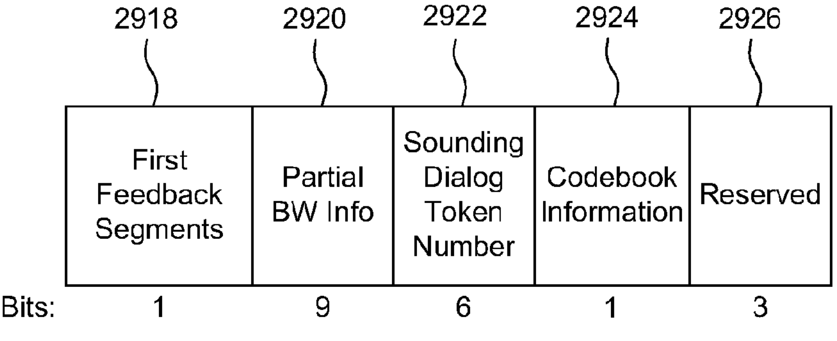

When the AP allows to receive the multiple feedback reports based on the same NDP from the same non-AP STA, the STA can use the reserved bits in EHT MIMO control field to indicate the index of the beamforming feedback. For example, it can use two bits as the indication. Two bits 00 may represent that it is the first portion of the feedback report. Two bits 01 may represent that it is the 2nd portion of the feedback report. Two bits 10 may represent the 3rd portion of the feedback report. Two bits 11 may represent the 4th portion of the feedback report. If the AP does not allow the non-AP STA to send back the compressed beamforming report information in multiple separate PPDUs, then these bits in EHT MIMO Control field may be disregarded. FIG. 29 illustrates an example EHT MIMO Control field 2900 format which includes the Index of Multiple Feedbacks subfield 2912. EHT MIMO Control field 2900 may include, but is not limited to, any of the following fields/subfields: Nc Index field 2902, Nc Index field 2904, BW field 2906, Grouping field 2908, Feedback Type subfield 2910, Index of Multiple Feedbacks field 2912, Reserved Field 2914, Remaining Feedback Segments field 2916, First Feedback Segments field 2918, Partial BW Info Field 2920, Sounding Dialog Token Number field 2922, Codebook Information field 2924, and Reserved Field 2926 (like fields may be as described above, unless otherwise indicated). The B14-B15 bit locations are used as an example of Index of Multiple Feedbacks subfield 2912 location such that other locations may be used, and Index of Multiple Feedbacks subfield 2912 may include two or more bits (e.g., B14-B6 or B37-B39).

In an example, the TXVECTOR parameter NUM_STS in an EHT sounding NDP frame sent by the beamformer may be limited by the minimum value of the Maximum Number of Supported EHT-LTFs set by any STA identified by a STA Info field in the preceding EHT NDP Announcement frame. The number of the EHT-LTFs in the NDP frame sent from the beamformer may be limited by the minimum value of EHT-LTF symbol number indicated in the Maximum Number of Supported EHT-LTFs subfield of the EHY PHY Capabilities Information field of any STA identified by a STA Info field in the preceding EHT NDP Announcement frame. In other words, without any additional signaling, an EHT beamformer may not transmit an EHT sounding NDP frame with the number of EHT-LTFs that is greater than the minimum value of EHT-LTF symbol numbers. That minimum value of EHT-LTF symbol numbers may be indicated in the Maximum Number of Supported EHT-LTFs subfield of the EHY PHY Capabilities Information field of any STA identified by a STA Info field in the preceding EHT NDP Announcement frame.

In an example, if the beamformer needs to transmit the NDP frame with the number of EHT-LTFs that is the greater than the minimum value of EHT-LTF symbol numbers indicated in the Maximum Number of Supported EHT-LTFs subfield (as included in the EHY PHY Capabilities Information field of any STA identified by a STA Info field in the preceding EHT NDP Announcement frame), the beamformer may indicate to the STA, for example in the Reserved bits of STA Info field in the NDP Announcement frame, the indices of EHT-LTFs that may be detected by the corresponding STA. The number of EHT-LTFs indicated to a STA may be less than or equal to the Maximum Number of Supported EHT-LTFs subfield of the EHY PHY Capabilities Information field of this STA.

In an example, two STAs (e.g., STA1 and STA2) may be the recipient STAs of the EHT sounding NDP frame sent by the beamformer. The Maximum Number of Supported EHT-LTFs (e.g., B3-B4 value defined in the Maximum Number of Supported EHT-LTFs subfield of the EHT PHY Capabilities Information field) to receive EHT NDP frame in STA1 may be four; The Maximum Number of Supported EHT-LTFs (e.g., B3-B4 value defined in the Maximum Number of Supported EHT-LTFs subfield of the EHT PHY Capabilities Information field) to receive EHT NDP frame in STA2 may be eight. In this case, the number of EHT-LTFs in the EHT sounding NDP frame is limited to the smaller of the two Maximum Number of Supported EHT-LTFs for the recipient STAs, which in this example is four. Example values for the Maximum Number of EHT-LTFs in NDP and NUM_STS subfield of TXVECTOR of the beamformer are shown in Table 8.

TABLE 8

Example Values for Maximum Number of EHT-LTFs in NDP and NUM_STS in AP (e.g., when NDP PPDU bandwidth is 160 Mhz)

| | Beamformee SS = 160 MHz subfield | Maximum Number Of Supported EHT-LTFs indicated for reception | Maximum Number of EHT-LTFs in NDP | NUM_STS in the Beamformer |
|---|---|---|---|---|
| STA1 | 2 | 4 | $N_{EHT\text{-}LTF} \leq \min(4,8) = 4$ | $NUM_{STS_{STA1}} \leq 2$ |
| STA2 | 8 | 8 | $\text{Max}\ (N_{EHT\text{-}LTF}) = 4$ | $NUM_{STS_{STA1}} \leq 8$ $NUM_{STS_{STA1}} + NUM_{STS_{STA2}} \leq 8$ |

Example parameters that may be included in TXVECTOR and example equations showing the maximum number of EHT-LTFs in NDP, N_(EHT-LTF) and TXVECTOR NUM_STS parameter in the beamformer are described in the following. Parameters that may be included in TXVECTOR of STA may include, but are not limited to: Max_Num_EHT_LTF and CHEST_ACCURACY. The Max_Num_EHT_LTF parameter or indication may indicate the maximum number of EHT-LTFs that can be used for transmission. The CHEST_ACCURACY parameter or indication may indicate the ideal MIMO channel estimation accuracy for each user. For example, CHEST_ACCURACY=1 may indicate basic channel estimation accuracy level where Initial $N_{EHT\text{-}LTF}$ symbols may be used, and CHEST_ACCURACY=2 may indicate where 2*Initial $N_{EHT\text{-}LTF}$ may be used.

A beamformer transmitting an NDP frame to multiple users (beamformees, STAs) may use TXVECTOR parameter Max_Num_EHT_LTF to calculate the number of EHT_LTF symbols that can be used in the NDP frame as described in the following. Max_Num_EHT_LTF≤min $(N_{EHT\text{-}LTF\text{-}STAi})$, where $N_{EHT\text{-}LTF\text{-}STAi}$ may be the number of EHT-LTFs indicated in the Maximum Number of EHT-LTFs subfield of the EHT PHY Capabilities Information field of STAi identified by a STA Info field in the preceding EHT NDP Announcement frame. The value in the Beamformee SS (<=80 MHz) or Beamformee SS (=160 MHz) or Beamformee SS (=320 Mhz) in the subfield of the EHT PHY Capabilities Information field of $STA_i$ may be defined as $N_{SS_i}$. In the sounding NDP frame, TXVECTOR parameter NUM_STS set for $STA_i$ (which is identified by a STA Info field in the preceding EHT NDP Announcement frame) per RU may be less than or equal to $N_{SS_i}$, i.e. $NUM\_STS_{STAi} \leq N_{SS_i}$. $NUM\_STS_{STAi}$ summed over all users (beamformees, STAs) per RU is not greater than a certain value, e.g., 8. The relationship $NUM\_STS \leq \max(NUM\_STS_{STA_i})$ may be defined. The number of EHT_LTF symbols used in the NDP transmission may be indicated in the following form(s):

$$N_{EHT-LTF} = \min(\text{Max\_Num\_EHT\_LTF},\ \text{NUM\_STS}); \quad \text{Equation (3)}$$

or $$N_{EHT-LTF} = \min(\text{Max\_Num\_EHT\_LTF},\ \text{NUM\_STS} * \text{CHEST\_ACCURACY}); \quad \text{Equation (4)}$$

or $$\text{NUM\_STS} \leq N_{EHT-LTF} \leq \text{Max\_Num\_EHT\_LTF} \quad \text{Equation (5)}$$

The AP performing a downlink (DL) data transmission may use TXVECTOR parameter Max_Num_EHT_LTF to calculate the number of EHT_LTF symbols that can be used in EHT MU PPDU as described in the following. Max_Num_EHT_LTF≤min$(N_{EHT\text{-}LTF\text{-}STAi})$, where $N_{EHT\text{-}LTF\text{-}STAi}$ may be the number of EHT-LTFs indicated in the Maximum Number of Supported EHT-LTFs subfield of the EHT PHY Capabilities Information field of $STA_i$ identified as the DL transmission recipient (STA) of this PPDU. The Initial_EHT_LTFs may be defined as the initial number of EHT-LTFs required for different number of spatial streams. The number of EHT_LTF symbol used in the transmission may be indicated in the following form: $N_{EHT\text{-}LTF}$=min (Max_Num_EHT_LTF, Initial_EHT_LTFs*CHEST_ACCURACY) for non-OFDMA and $N_{EHT\text{-}LTF}$=min(Max_Num_EHT_LTF, Initial_EHT_LTFs) for OFDMA; or $N_{EHT\text{-}LTF}$ Max_Num_EHT_LTF, where the actual number of EHT-LTFs symbols may be more than Initial_EHT_LTFs for non-OFDMA and the final value of N_EHT_LTF is implementation dependent.

Example indications of the maximum number of EHT-LTF Symbols for transmission are described herein. In an example, an EHT beamformer may not transmit an EHT sounding NDP frame with a TXVECTOR parameter NUM_EHT_LTF that is greater than the maximum number of EHT_LTF symbols indicated in the Maximum Number of Supported EHT_LTFs subfield of any STA identified by a STA Info field in the preceding EHT NDP Announcement frame. The value of TXVECTOR parameter NUM_EHT_LTF may follow $N_{EHT\text{-}LTF}$ constraint as given by Equations (3), (4) or (5). In an example, Number Of Sounding Dimensions (e.g., s 80 MHz) subfield in EHT PHY capabilities information element may indicate that for a bandwidth less than or equal to 80 MHz, the beamformer's capability of transmitting the maximum number of EHT-LTF symbols may follow $N_{EHT\text{-}LTF}$ constraint as given by Equations (3), (4) or (5). Number Of Sounding Dimensions (e.g., =160 MHz) subfield in EHT PHY capabilities information may indicate that for a bandwidth of 160 MHz, the beamformer's capability of transmitting the maximum number of EHT-LTF symbols may follow $N_{EHT\text{-}LTF}$ constraint as given by Equations (3), (4) or (5). Number Of Sounding Dimensions (e.g., =320 MHz) subfield in EHT PHY capabilities information indicates that for the bandwidth of 320 MHz, the beamformer's capability of transmitting the maximum number of EHT-LTF symbols may follow $N_{EHT\text{-}LTF}$ constraint as given by Equations (3), (4) or (5).

An EHT beamformer may indicate the maximum number of EHT-LTF symbols that it may transmit in a 20 MHz, 40 MHz, or 80 MHz EHT sounding NDP frame in the Number Of Sounding Dimensions (≤80 MHz) subfield. An EHT beamformer may indicate the maximum number of EHT-LTF symbols that it may transmit in a 160 MHz EHT sounding NDP in the Number Of Sounding Dimensions (=160 MHz) subfield. An EHT beamformer may indicate the maximum number of EHT-LTF symbols that it may transmit in a 320 MHz EHT sounding NDP frame in the Number Of Sounding Dimensions (=320 MHz) subfield. An EHT beamformer may not transmit a 20 MHz, 40 MHz, or 80 MHz EHT sounding NDP frame where the number of EHT-LTF symbols exceeds the value indicated in the Number Of Sounding Dimensions (≤80 MHz) subfield. An EHT beamformer may not transmit a 160 MHz EHT sounding NDP frame where the number of EHT-LTF symbols exceeds the value indicated in the Number Of Sounding Dimensions (=160 MHz) subfield. An EHT beamformer may not transmit a 320 MHz EHT sounding NDP frame where the number of EHT-LTF symbols exceeds the value indicated in the Number Of Sounding Dimensions (=320 MHz) subfield.

In an example, an EHT beamformer may indicate that the maximum number of EHT-LTF symbols that it may transmit in a 20 MHz, 40 MHz, or 80 MHz EHT sounding NDP frame may follow $N_{EHT\text{-}LTF}$ constraint as defined by Equations (3), (4) or (5). However, the EHT beamformer may not transmit a 20 MHz, 40 MHz, or 80 MHz EHT sounding NDP frame where the number of EHT-LTF symbols does not follow $N_{EHT\text{-}LTF}$ as defined by Equations (3), (4) or (5). An EHT beamformer may indicate that the maximum number of EHT-LTF symbols that it may transmit in a 160 MHz EHT sounding NDP frame may follow $N_{EHT\text{-}LTF}$ constraint as defined by Equations (3), (4) or (5). However, the EHT beamformer may not transmit a 160 MH EHT sounding NDP frame where the number of EHT-LTF symbols does not follow $N_{EHT\text{-}LTF}$ as defined by Equations (3), (4) or (5). An EHT beamformer may indicates that the maximum number of EHT-LTF symbols that it may transmit in a 320 MHz EHT sounding NDP may follow $N_{EHT\text{-}LTF}$ constraint as defined by Equations (3), (4) or (5). However, the EHT beamformer may not transmit a 320 MHz EHT sounding NDP frame where the number of EHT-LTF symbols does not follow $N_{EHT\text{-}LTF}$ as defined by Equations (3), (4) or (5).

In an example EHT non-TB sounding procedure, the feedback resource unit (RU)/multiple resource unit (MRU) size indicated (e.g., in the Partial BW Info subfield) in the EHT NDP Announcement frame may not include the subchannels indicated in the Disabled Subchannel Bitmap field in the EHT Operation element. Instead, the feedback RU/MRU size indicated in the Partial BW Info subfield in the EHT NDP Announcement frame may be the same as or a subset of the subchannels allowed by the EHT Operation element. According to an example EHT non-TB sounding procedure, the information carried in the Punctured Channel Information subfield of the preamble (e.g., the U-SIG field) of an EHT MU PPDU used for transmitting CSI/CQI feedback may explicitly indicate the subchannels that carry the CSI/CQI feedback. In an example, the information carried in the Punctured Channel Information subfield of the preamble (e.g., the U-SIG field) of the EHT MU PPDU used for transmitting CSI/CQI feedback may implicitly indicate the subchannels on which the Beamforming (BF) report or CSI/CQI report had been measured.

Example puncturing scenarios to be used with an EHT non-TB sounding procedure are described in the following. In an example puncturing approach, when a puncturing pattern indicated (e.g., in the Partial BW Info subfield) in the EHT NDP Announcement frame is same as the puncturing pattern indicated in a preceding beacon frame, the punctured subchannels indicated in the Punctured Channel Information subfield of the U-SIG field of the EHT MU PPDU that carry the CSI/CQI feedback may have the same as, or more punctured subchannels than, those indicated in the beacon frame. In other words, the punctured subchannels indicated in the Punctured Channel Information subfield of the U-SIG field of the EHT MU PPDU that carries CSI/CQI feedback may have more punctured subchannels than that indicated in the beacon frame or indicated in the Partial BW Info subfield in the EHT NDP Announcement frame.

In another example puncturing approach, when the puncturing pattern (e.g., indicated in the Partial BW Info subfield) in the EHT NDP Announcement frame is different from the puncturing pattern indicated in a preceding beacon frame but the subchannels that are not punctured indicated in the Partial BW Info subfield in the EHT NDP Announcement frame do not include the subchannels indicated in the Disabled Subchannel Bitmap field in the EHT Operation element, the punctured subchannels indicated in the Punctured Channel Information subfield of the U-SIG field of the (UL) EHT MU PPDU that carries CSI/CQI feedback may include the same, fewer, or more punctured subchannels that what is indicated in the Partial BW Info subfield in the EHT NDP Announcement frame. In other words, the punctured subchannels indicated in the Punctured Channel Information subfield of the U-SIG field of the EHT MU PPDU that carries CSI/CQI feedback may have fewer or more punctured subchannels than those indicated in the Partial BW Info subfield in the EHT NDP Announcement frame. However, the channel used in the EHT MU PPDU that carries the CSI/CQI feedback from the STAs to the AP may not include the subchannels indicated in the Disabled Subchannel Bitmap field in the EHT Operation element.

Figure 30:
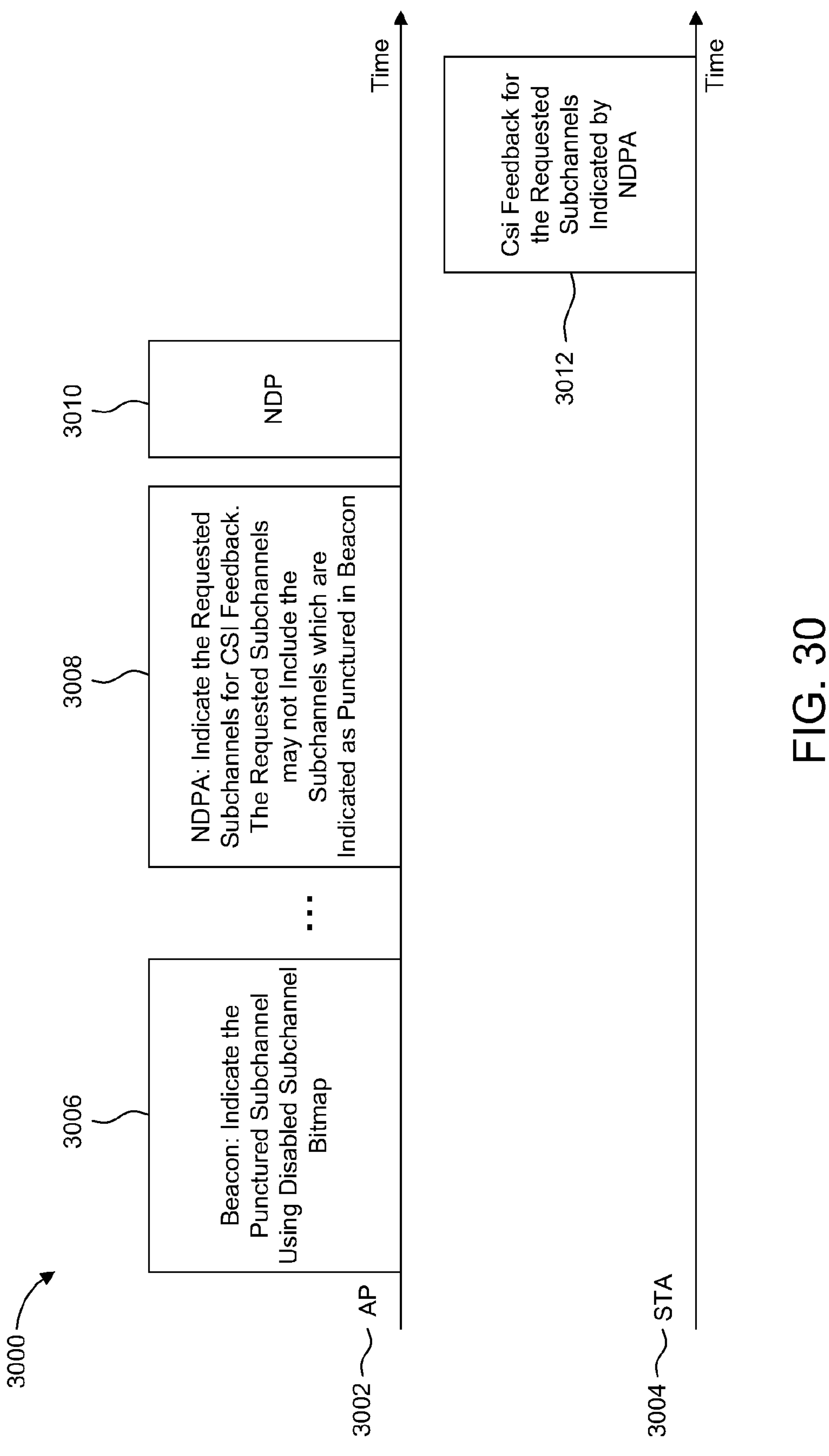
FIG. 30 is a diagram illustrating an example non-TB sounding procedure.

FIG. 30 is a diagram illustrating an example non-TB sounding procedure 3000. Although one STA 3004 is shown, the example applies similarly to a scenario with multiple STAs. AP 3002 may transmit to STA 3004 a beacon frame 3006. Beacon frame 3006 may include an indication of one or more (at least one) punctured subchannel and one or more (at least one) subchannel that is not punctured. The indication of the punctured subchannel(s) and subchannel(s) that is not punctured may be indicated as, for example, a disabled subchannel bitmap (e.g., a bit set to '1' indicates a corresponding 20 MHz subchannel is punctured, and a bit set to '0' indicates a corresponding 20 MHz subchannel is non-punctured). AP 3002 may transmit to STA 3004 NDPA frame 3008, which may include an indication of subchannels for measuring channel characteristics that STA 3004 may use to measure the channel (e.g., to generate CSI and/or CQI feedback). The indicated subchannels for measuring channel characteristics may be equal to or a subset of the subchannel (s) that is not punctured indicated by the beacon frame 3006. The AP 3002 may transmit to STA 3004 an NDP frame 3010. The STA 3004 may perform measurements on the subchannel(s) for measuring feedback indicated by NDPA frame 3008 using (the preamble of) the received NDP frame 3010 to generate CSI feedback. The STA 3004 may transmit CSI feedback report frame 3012 to the AP 3002, where the CSI feedback report frame 3012 includes the generated CSI feedback. The CSI feedback may be transmitted on at least part of the indicated subchannel(s).

Figure 31:
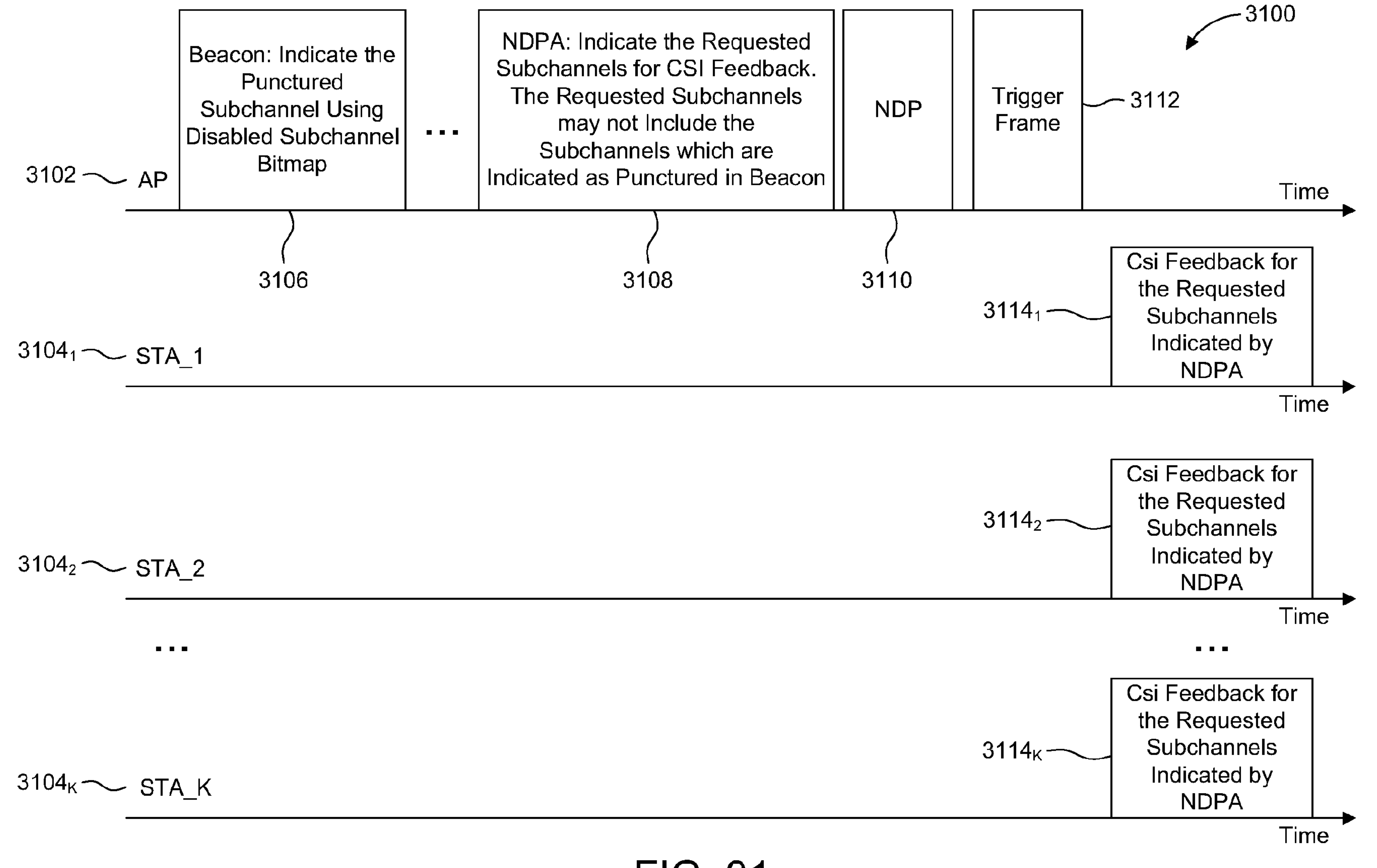
FIG. 31 is a diagram illustrating an example TB sounding procedure.

FIG. 31 is a diagram illustrating an example TB sounding procedure 3100. Any number, k, of STAs $\mathbf{3104}_1, \ldots, \mathbf{3104}_k$ may be considered. AP 3102 may transmit to STAs $\mathbf{3104}_1, \ldots, \mathbf{3104}_k$ a beacon frame 3106. Beacon frame 3106 may include an indication of one or more (at least one) punctured subchannel and one or more (at least one) subchannel that is not punctured. The indication of the punctured subchannel(s) and subchannel(s) that is not punctured may be indicated as, for example, a disabled subchannel bitmap (e.g., a bit set to '1' indicates a corresponding 20 MHz subchannel is punctured, and a bit set to '0' indicates a corresponding 20 MHz subchannel is non-punctured). AP 3102 may transmit to STAs $\mathbf{3104}_1, \ldots, \mathbf{3104}_k$ NDPA frame 3108, which may include an indication of subchannels for measuring channel characteristics that STAs $\mathbf{3104}_1, \ldots, \mathbf{3104}_k$ may use to measure the channel (e.g., to generate CSI and/or CQI feedback). The indicated subchannels for measuring channel characteristics may be equal to or a subset of the subchannel(s) that is not punctured indicated by the beacon frame 3106. The AP 3102 may transmit to STAs $\mathbf{3104}_1$, . . . , STA $\mathbf{3104}_k$ an NDP frame 3110. The STAs $\mathbf{3104}_1$, . . . , STA $\mathbf{3104}_k$ may perform measurements on the subchannel(s) for measuring feedback indicated by NDPA frame 3108 using (the preamble of) the received NDP frame 3110 to generate CSI feedback. The STAs $\mathbf{3104}_1$, . . . , STA$\mathbf{3104}_k$ may receive trigger frame 3112, which may trigger the STAs $\mathbf{3104}_1$, . . . , STA $\mathbf{3104}_k$ to send CSI CSI feedback report frames $\mathbf{3114}_1, \ldots, \mathbf{3114}_k$. trigger frame 3112 may indicate channels for CSI transmission. The STAs $\mathbf{3104}_1$, . . . , STA $\mathbf{3104}_k$ may use the indicated channels for CSI transmission to transmit CSI feedback report frames $\mathbf{3114}_1, \ldots, \mathbf{3114}_k$ The STAs $\mathbf{3104}_1$, . . . , STA $\mathbf{3104}_k$ may transmit respective CSI feedback report frames $\mathbf{3114}_1, \ldots, \mathbf{3114}_k$ to the AP 3102, where the CSI feedback report frames $\mathbf{3114}_1, \ldots, \mathbf{3114}_k$ include the generated CSI feedback by the respective STAs $\mathbf{3104}_1$, . . . , STA $\mathbf{3104}_k$.

Figures 32A, 32B, 32C:
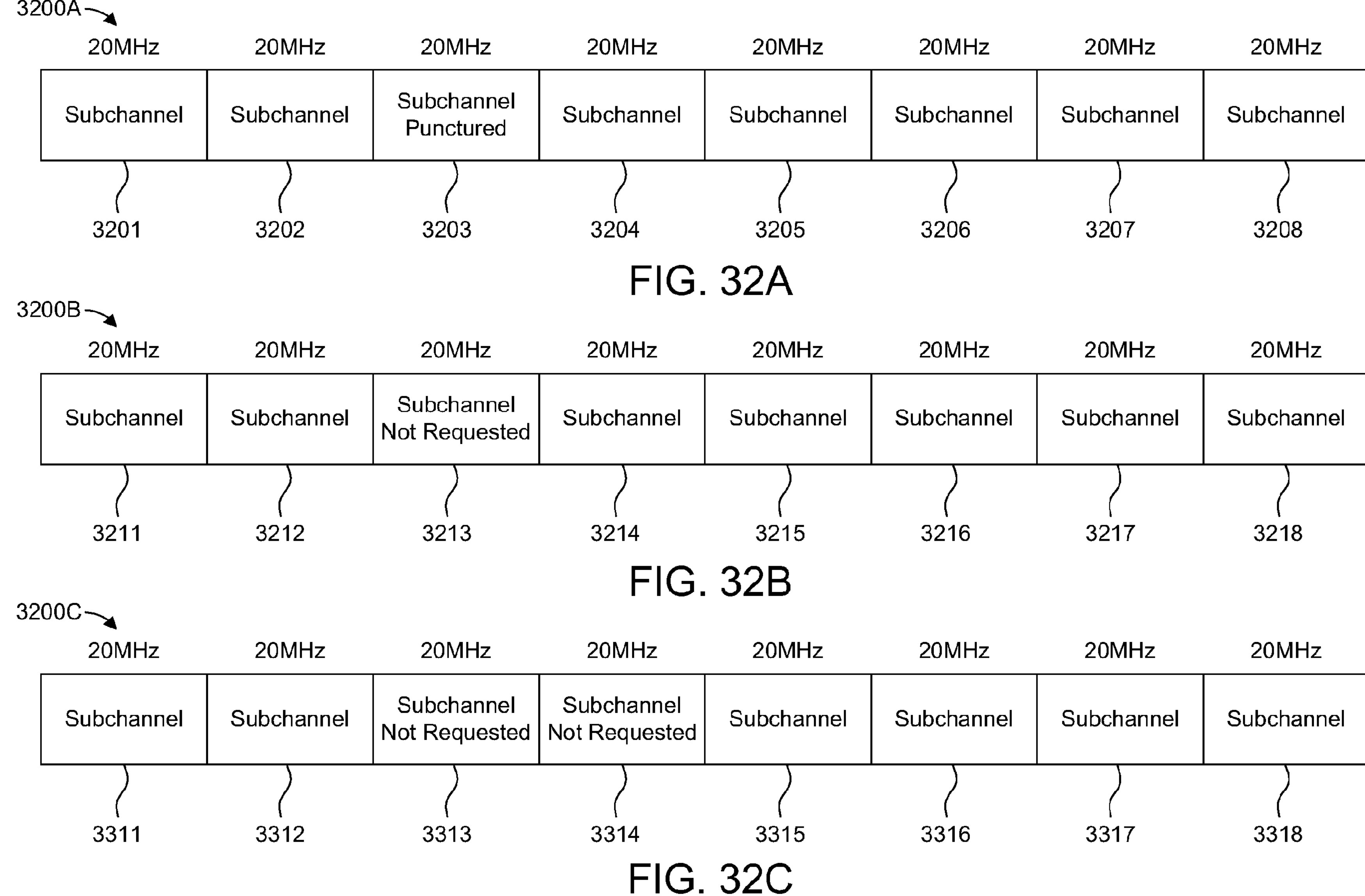
FIG. 32A is a diagram illustrating an example Punctured subchannel pattern.
FIGS. 32B and 32C are diagrams illustrating example feedback patterns 3200B and 3200C, respectively, based on the subchannel pattern of FIG. 32A.

FIGS. 32A, 32B, and 32C illustrate an example of punctured subchannel indicated by the Disabled Bitmap field in the EHT Operation element versus the options of the feedback indicated in the Partial BW Info subfield in the EHT NDP Announcement frame.

FIG. 32A is a diagram illustrating an example Punctured subchannel pattern 3200A, which may be indicated by the Disabled Bitmap field in the EHT Operation element or the feedback indicated in the Partial BW Info subfield in the EHT NDP Announcement frame. According of Punctured subchannel pattern 3200A in FIG. 32A, subchannel 3203 may be punctured, and subchannels 3201, 3202, 3204, 3205-3208 may not be punctured (subchannel bandwidths may be 20 MHz each). In this case, the punctured subchannel 3203 may be indicated by a Disabled Subchannel Bitmap field in the EHT Operation element with form '0010 0000 0000 0000', where '1' may the subchannel being punctured, and '0' not punctured.

FIGS. 32B and 32C are diagrams illustrating example feedback patterns 3200B and 32000, respectively, based on the subchannel patterns 3200A of FIG. 32A. According to the feedback pattern 3200B in FIG. 32B, the feedback RU/MRU size indicated in a Partial BW Info subfield in the EHT NDP Announcement frame may be the same as the subchannels allowed by the EHT Operation element (e.g., Partial BW Info subfield values in binary format (B0 B1 B2 B3 B4 B5 B6 B7 B8) in NDP Announcement frame are 011011111, where 1 represents the feedback is requested on the corresponding subchannel). According to the feedback pattern 3200C in FIG. 32C, the feedback RU/MRU size indicated in the Partial BW Info subfield in the EHT NDP Announcement frame is the subset of the subchannels allowed by the EHT Operation element, e.g., Partial BW Info subfield values in binary format (B0 B1 B2 B3 B4 B5 B6 B7 B8) in NDP Announcement frame are 011001111, where 1 represents the feedback is requested on the corresponding subchannel.

Although the features and elements of the present invention are described in the preferred embodiments in particular combinations, each feature or element can be used alone without the other features and elements of the preferred embodiments or in various combinations with or without other features and elements of the present invention.

Although the embodiments described herein consider 802.11 specific protocols, it is understood that the embodiments described herein are not restricted to this scenario and are applicable to other wireless systems such as cellular networks as well.

Although SIFS is used to indicate various inter frame spacing in the examples of the designs and procedures, all other inter frame spacing such as RIFS, AIFS, DIFS or other agreed time interval could be applied in the same solutions.

Although four RBs per triggered TXOP are shown in some figures as example, the actual number of RBs/channels/bandwidth utilized may vary.

Although specific bits are used to signal in-BSS/OBSS as example, other bit may be used to signal this information.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A station (STA) configured to perform a sounding procedure, the STA comprising:

a processor; and a transceiver, wherein the processor and the transceiver are configured to:

receive, from an access point (AP), a beacon frame, wherein the beacon frame includes a first indication of at least one punctured subchannel;

receive, from the AP, a null data packet (NDP) announcement (NDPA) frame including a second indication of the at least one punctured subchannel and an indication of at least one subchannel for measuring channel characteristics, wherein the at least one subchannel for measuring channel characteristics include at least one non-punctured subchannel other than the indicated at least one punctured subchannel;

receive, from the AP, an NDP frame; and transmit, to the AP, a feedback report frame, on subchannels excluding the at least one punctured subchannel, including a universal signal (U-SIG) field indicating the at least one punctured subchannel and channel state information (CSI) feedback, wherein the CSI feedback is based on measurements that the STA performed on the received NDP frame using the indicated subchannels for measuring channel characteristics.

2. The STA of claim 1, wherein the indication of the at least one punctured subchannel is indicated as a disabled subchannel bitmap.

3. The STA of claim 1, wherein the subchannels for measuring channel characteristics do not include the indicated at least one punctured subchannel.

4. The STA of claim 1, wherein the indication of the at least one punctured subchannel is included in an extremely high throughput (EHT) operation element of the received beacon frame.

5. The STA of claim 1, wherein the subchannels for measuring channel characteristics are 20 MHz channels.

6. The STA of claim 1, wherein the feedback report frame is included in a multi-user (MU) physical layer protocol data unit (PPDU).

7. The STA of claim 1, wherein the feedback report frame further includes channel quality information (CQI), wherein the CQI is based on the measurements that the STA performed on the received NDP frame using the indicated subchannels for measuring channel characteristics.

8. The STA of claim 1, wherein the feedback report frame is transmitted on at least one of the indicated subchannels for measuring channel characteristics.

9. The STA of claim 1, wherein the processor and the transceiver are further configured to:

receive, from the AP, a trigger frame including an indication of subchannels for transmitting the CSI feedback, wherein the feedback report frame is transmitted in response to the received trigger frame and on the indicated subchannels for transmitting the CSI feedback.

10. The STA of claim 1, wherein the CSI feedback includes an index of a quantized beamforming matrix V.

11. A method for sounding performed by a station (STA), the method comprising:

receiving, from an access point (AP), a beacon frame, wherein the beacon frame includes a first indication of at least one punctured subchannel;

receiving, from the AP, a null data packet (NDP) announcement (NDPA) frame including a second indication of the at least one punctured subchannel and an indication of at least one subchannel for measuring channel characteristics, wherein the at least one subchannel for measuring channel characteristics include at least one non-punctured subchannel other than the indicated at least one punctured subchannel;

receiving, from the AP, an NDP frame; and transmitting, to the AP, a feedback report frame, on subchannels excluding the at least one punctured subchannel, including a universal signal (U-SIG) field indicating the at least one punctured subchannel and channel state information (CSI) feedback, wherein the CSI feedback is based on measurements that the STA performed on the received NDP frame using the indicated subchannels for measuring channel characteristics.

12. The method of claim 11, wherein the indication of the at least one punctured subchannel is indicated as a disabled subchannel bitmap.

13. The method of claim 11, wherein the subchannels for measuring channel characteristics do not include the indicated at least one punctured subchannel.

14. The method of claim 11, wherein the indication of the at least one punctured subchannel is included in an extremely high throughput (EHT) operation element of the received beacon frame.

15. The method of claim 11, wherein the subchannels for measuring channel characteristics are 20 MHz channels.

16. The method of claim 11, wherein the feedback report frame is included in a multi-user (MU) physical layer protocol data unit (PPDU).

17. The method of claim 11, wherein the feedback report frame further includes channel quality information (CQI), wherein the CQI is based on the measurements that the STA performed on the received NDP frame using the indicated subchannels for measuring channel characteristics.

18. The method of claim 11, wherein the feedback report frame is transmitted on at least one of the indicated subchannels for measuring channel characteristics.

19. The method of claim 11, further comprising:

receiving, from the AP, a trigger frame including an indication of subchannels for transmitting the CSI feedback, wherein the feedback report frame is transmitted in response to the received trigger frame and on the indicated subchannels for transmitting the CSI feedback.

20. The method of claim 11, wherein the CSI feedback includes an index of a quantized beamforming matrix V.

* * * * *